(12) United States Patent
Kawasaki

(10) Patent No.: US 7,852,956 B2
(45) Date of Patent: Dec. 14, 2010

(54) COMMUNICATIONS SYSTEM, TRANSMITTER, RECEIVER, AND COMMUNICATIONS METHOD THEREOF

(75) Inventor: Toshio Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 632 days.

(21) Appl. No.: 11/802,987

(22) Filed: May 29, 2007

(65) Prior Publication Data

US 2007/0274201 A1    Nov. 29, 2007

Related U.S. Application Data

(63) Continuation-in-part of application No. 11/528,373, filed on Sep. 28, 2006, now abandoned.

(30) Foreign Application Priority Data

May 29, 2006  (JP)  ............................ 2006-148900
May 15, 2007  (JP)  ............................ 2007-129766

(51) Int. Cl.
H04L 27/28  (2006.01)

(52) U.S. Cl. .................... 375/260; 370/343; 370/252

(58) Field of Classification Search .................. None
See application file for complete search history.

(56) References Cited

U.S. PATENT DOCUMENTS 5,124,979 A * 6/1992 Matui ........................ 370/496
2002/0181610 A1 12/2002 Sumasu et al. .............. 375/296
2003/0016640 A1 * 1/2003 Onggosanusi et al. ....... 370/335
2006/0115010 A1 * 6/2006 Rog et al. .................... 375/260

FOREIGN PATENT DOCUMENTS

| EP | 1659722 A1 | 5/2006 |
| JP | A-2002-077097 | 3/2002 |
| JP | A-2005-101975 | 4/2005 |

OTHER PUBLICATIONS

European Office Action for the corresponding European Patent Application No. 07 109 176.5-1525 dated Jul. 15, 2008.
Xiao Huang et al., "Reduction in Papr of OFDM System Using a Revised Compandi", pp. 62-66 (Nov. 2002).
Y.J. Kou et al., "New Peak-to-Average Power-Ratio Reduction Algorithms for OFDM Systems Using Constellation Extension", pp. 514-517 (Aug. 2005).

* cited by examiner

Primary Examiner—Huy D Vu
Assistant Examiner—James P Duffy
(74) Attorney, Agent, or Firm—Myers Wolin, LLC

(57) ABSTRACT

Sample signals P0(0) to P0(N−1) are input for each symbol of a multiplexed transmission sample or transmission chip. The sum of a particular pair of sample signals (for example, a pair of P0(0) and P0(N/2)) is obtained by an adder for each pair of sample signals, and a signal the power of which is halved by attenuating the sum with an attenuator is generated and output as a dispersion signal P1(N/2). Additionally, a difference between the pair of the sample signals is obtained by a subtractor, and a signal the power of which is halved by attenuating the difference with an attenuator is generated and output as a dispersion signal P1(0). The dispersion signals P1(0) and P1(N/2) are made to respectively correspond to first and second subsymbols, which are configured by partitioning the symbol.

15 Claims, 24 Drawing Sheets

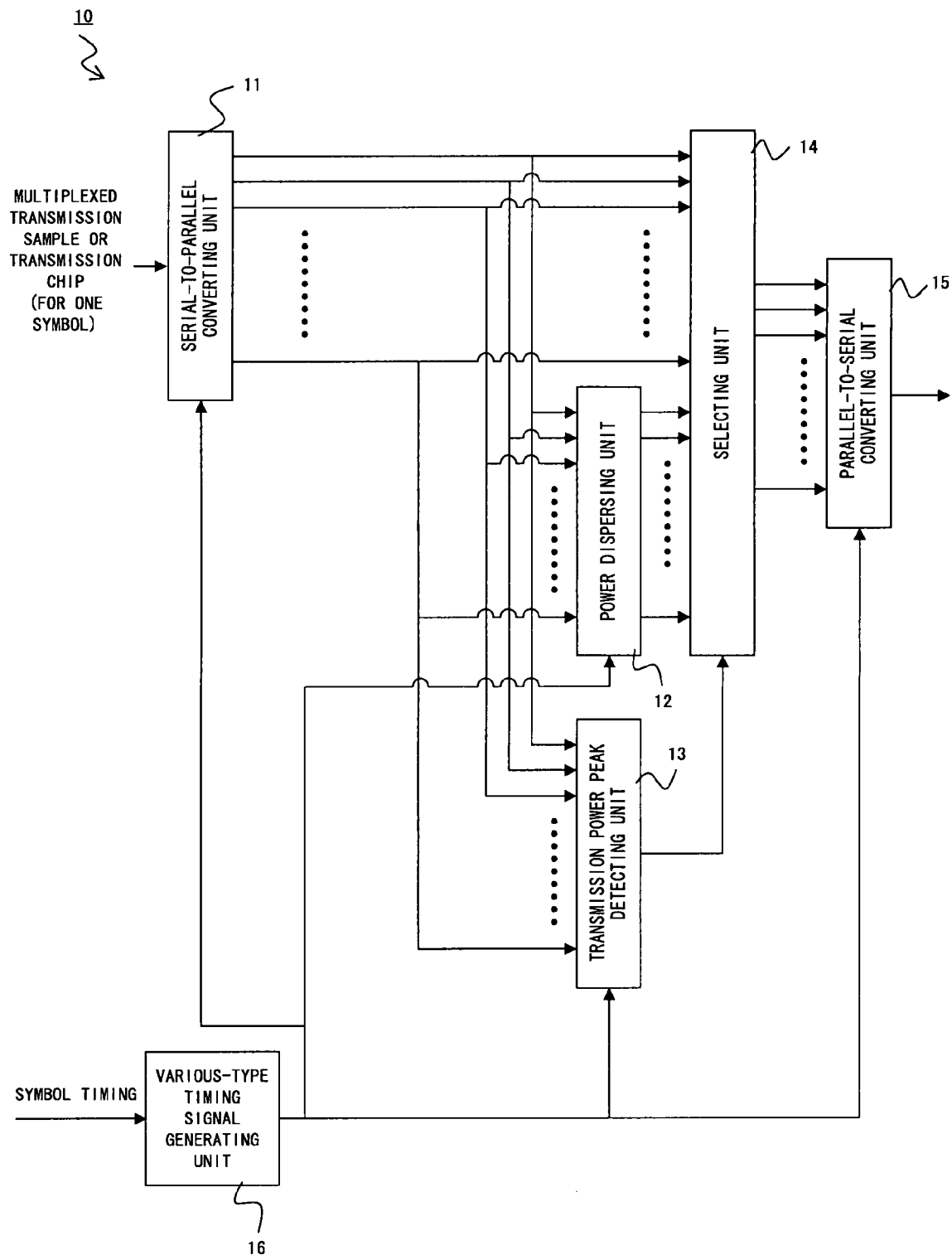
F I G. 1

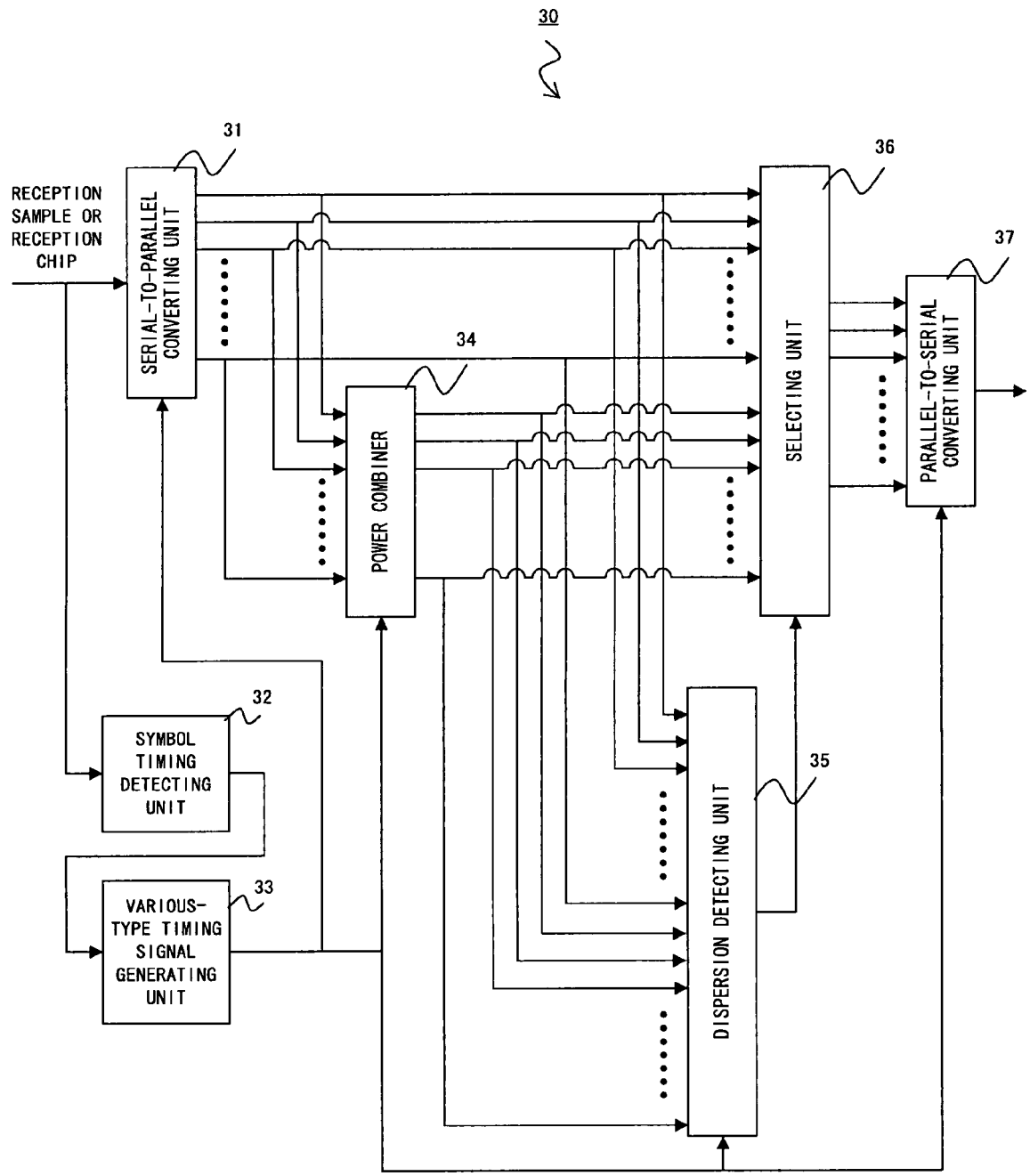
F I G. 3

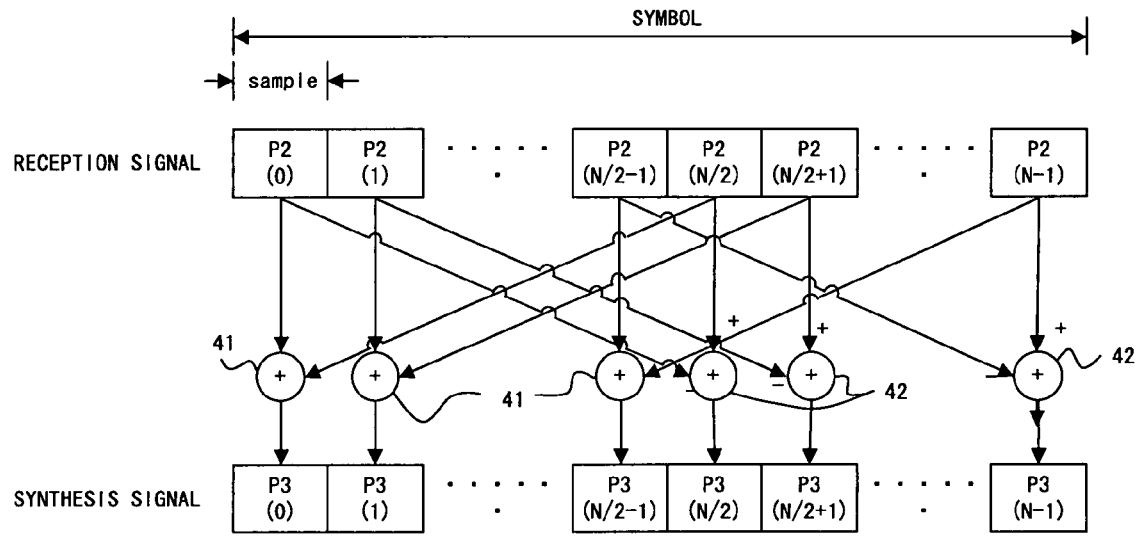
F I G. 4A
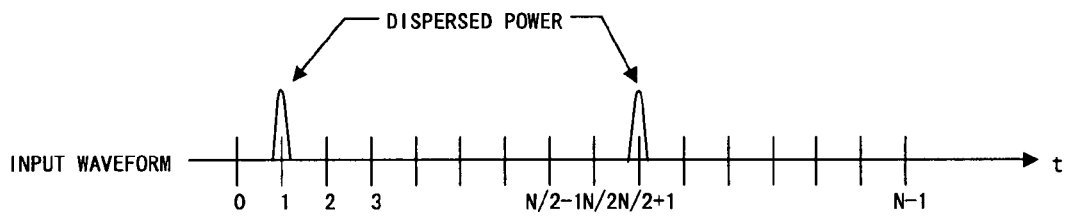
F I G. 4B
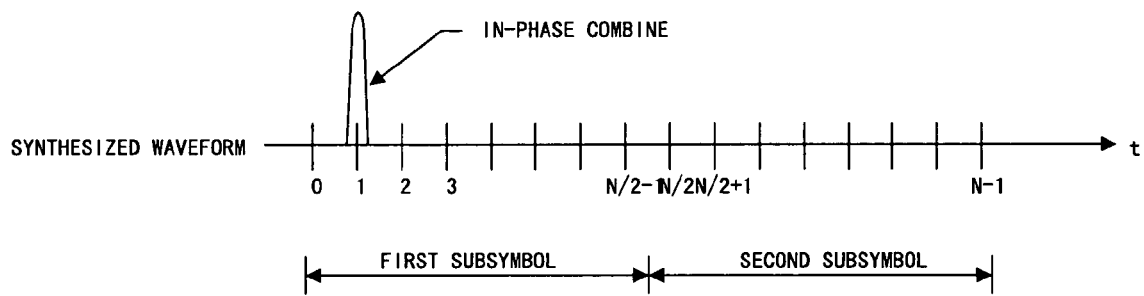
F I G. 4C

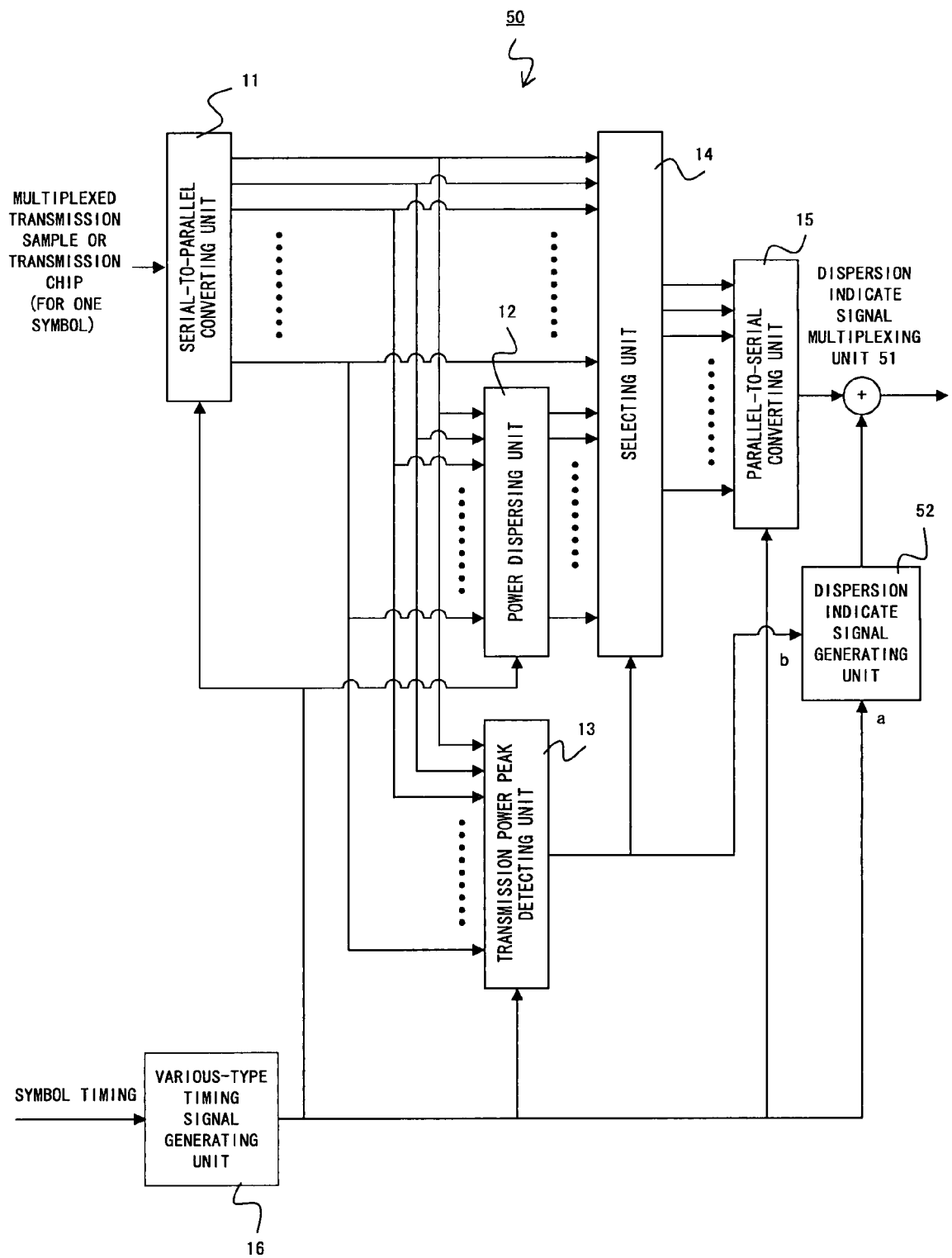
F I G. 5

FIG. 6A
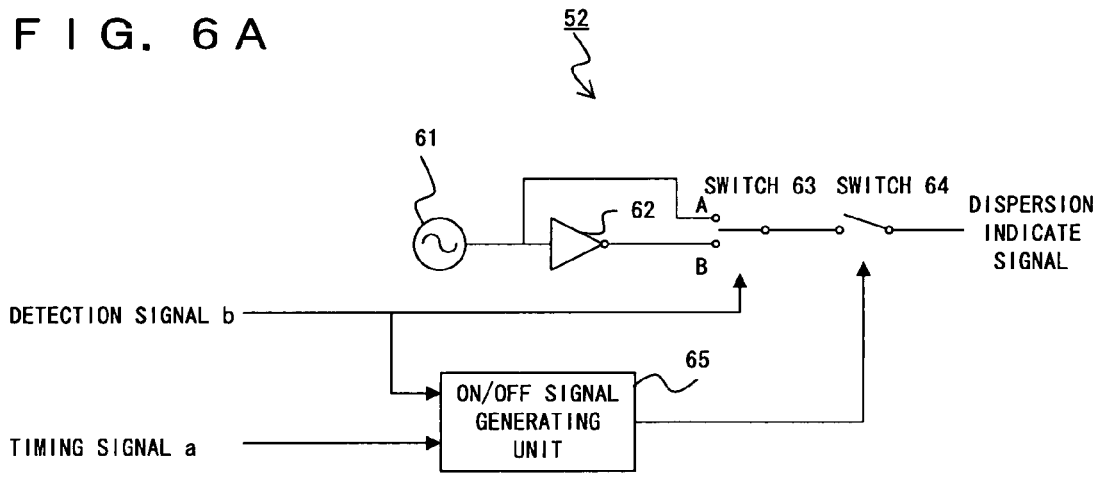
FIG. 6B
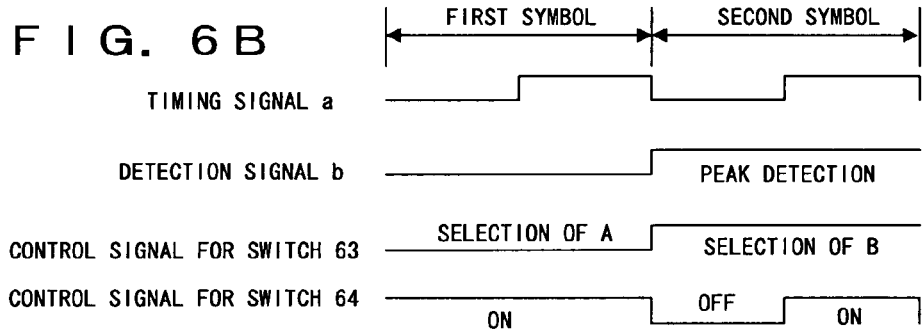
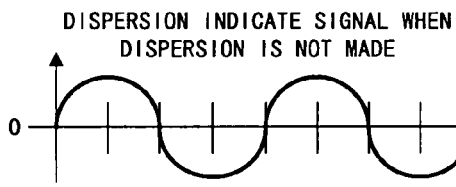
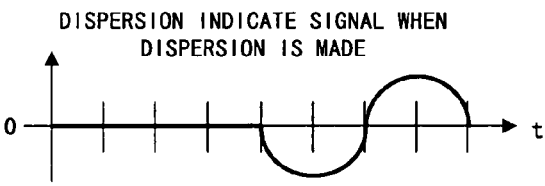
FIG. 6C
FIG. 6D

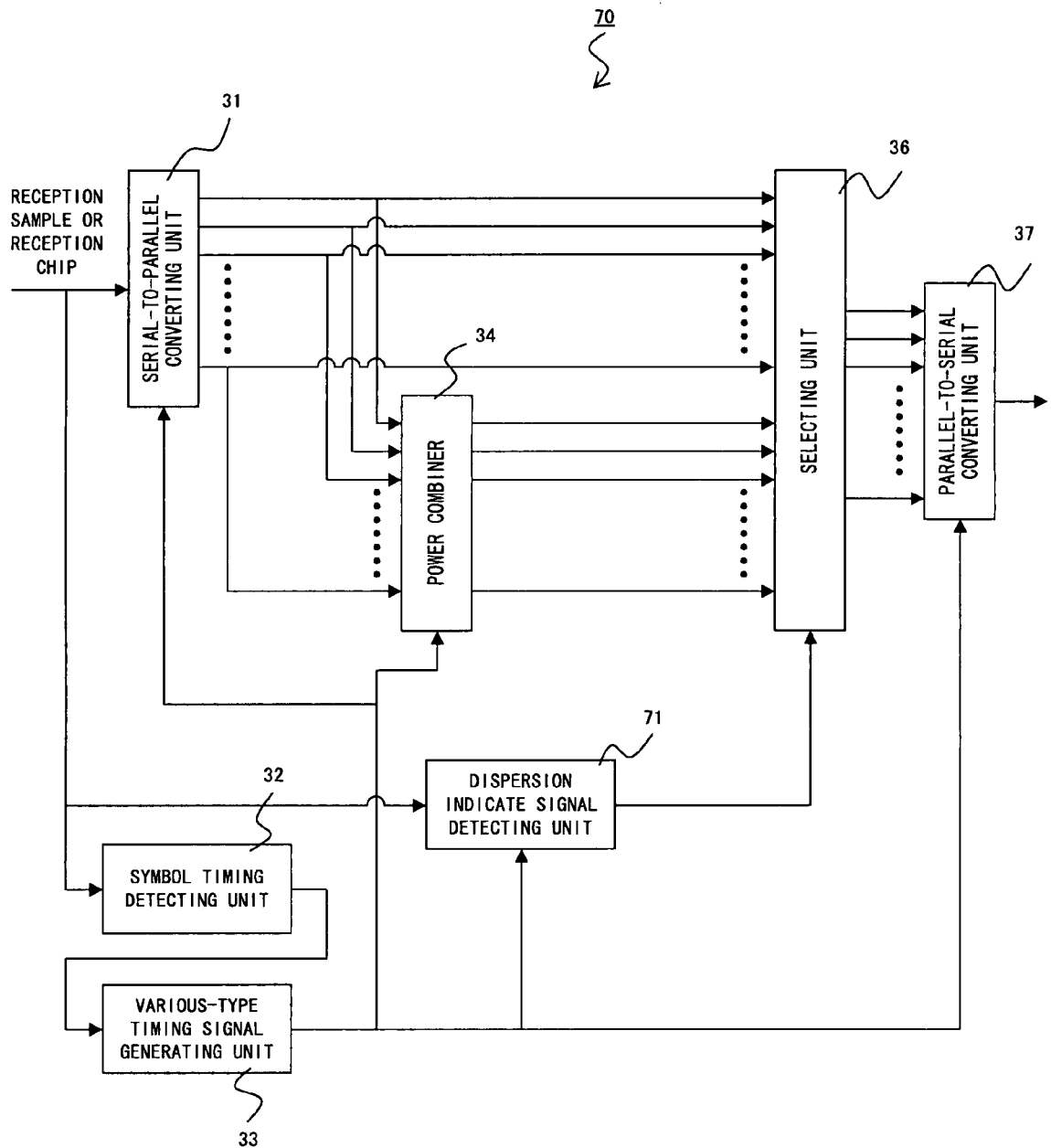
F I G. 7

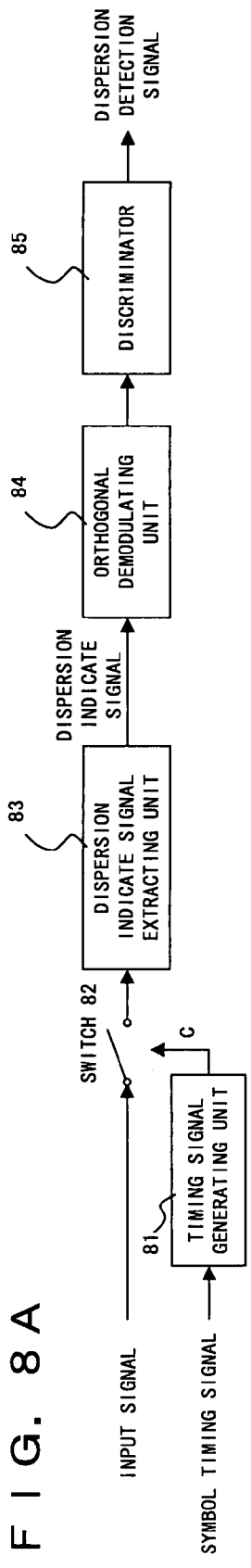
F I G. 8A
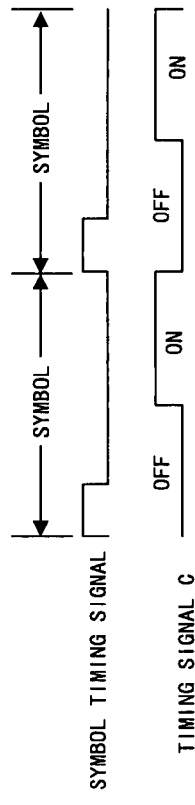
F I G. 8B
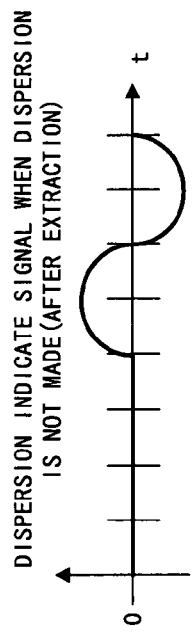
F I G. 8C
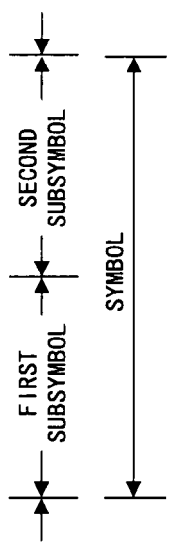
F I G. 8D

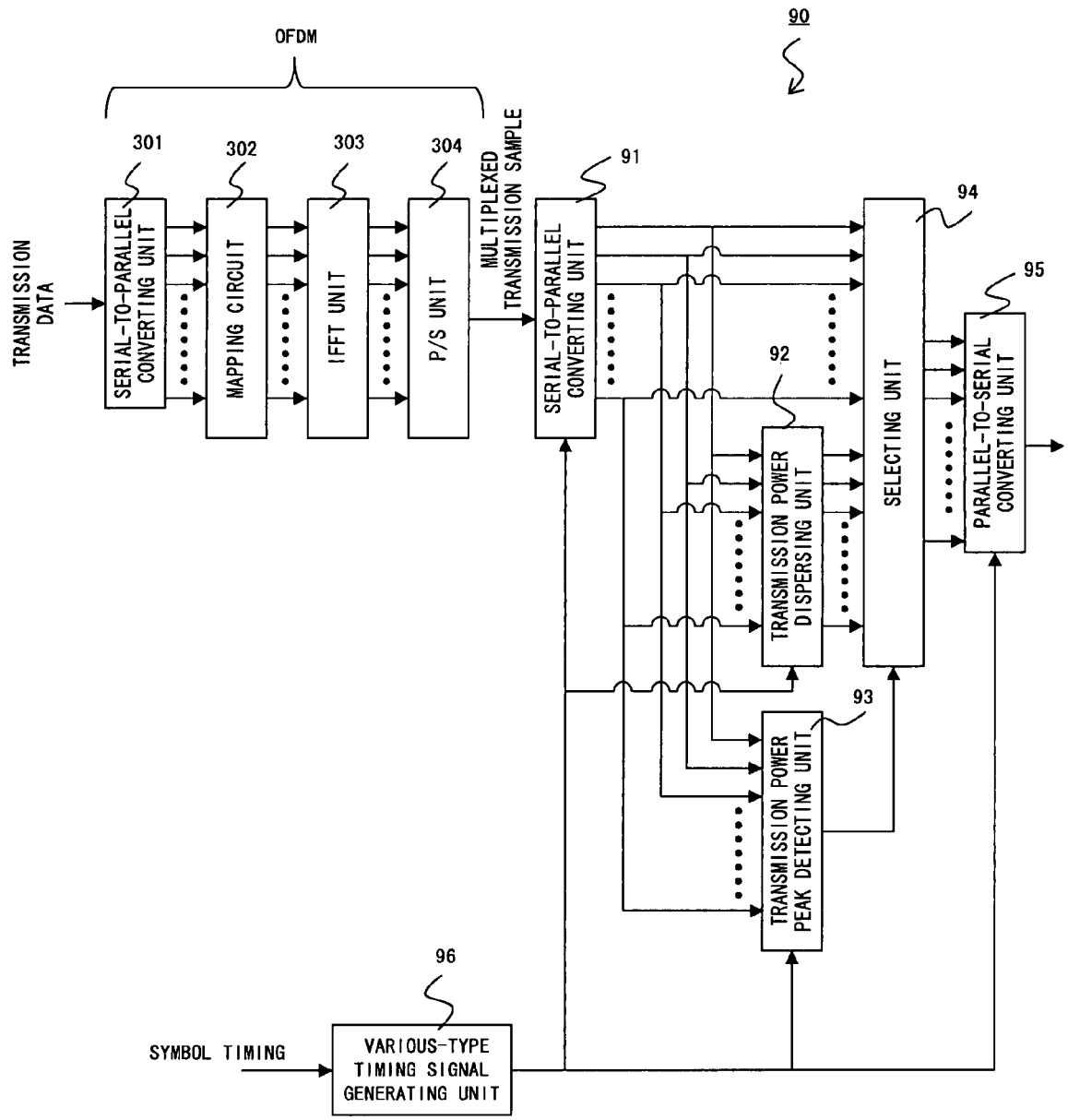
F I G. 9

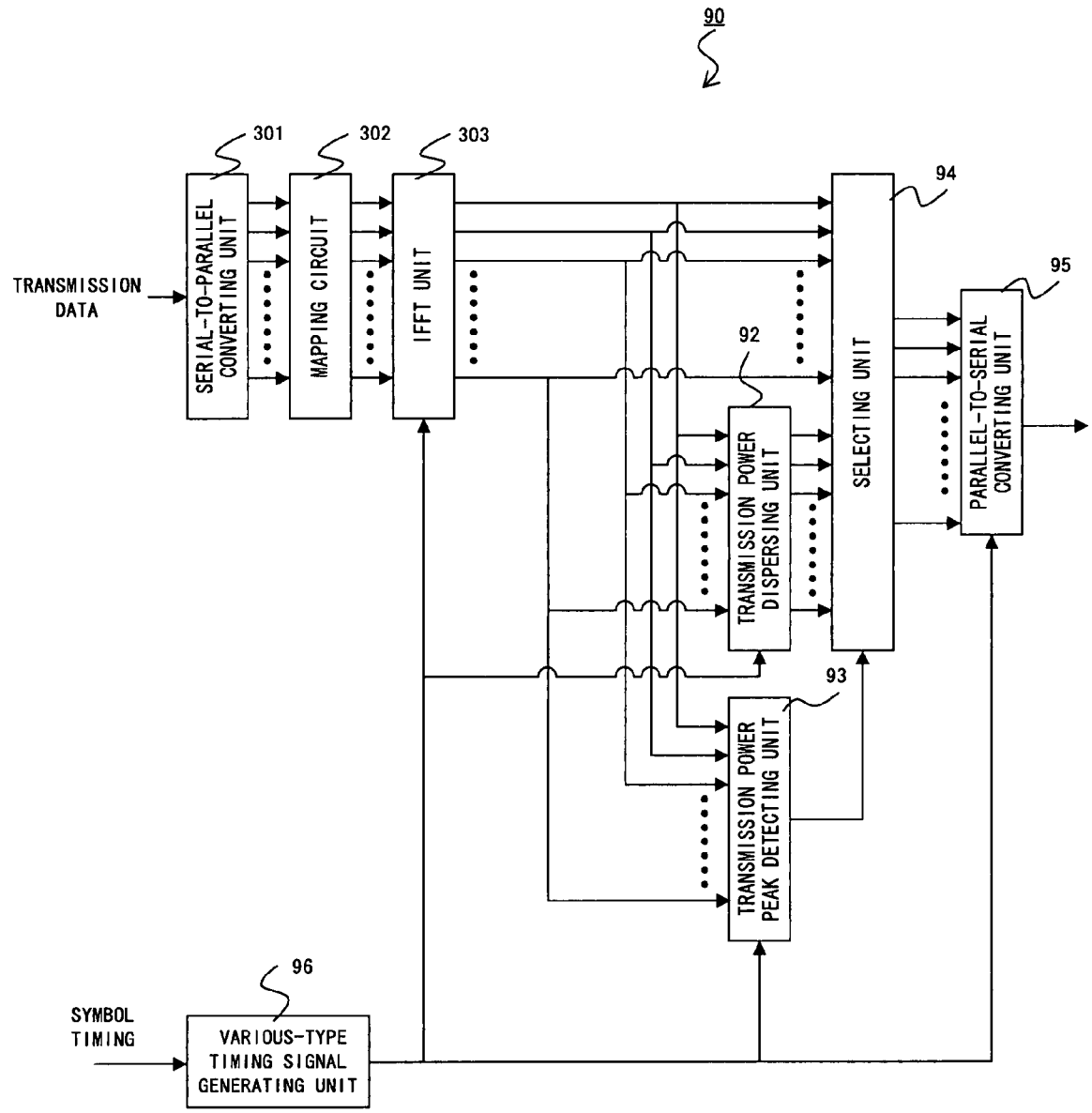
F I G. 10

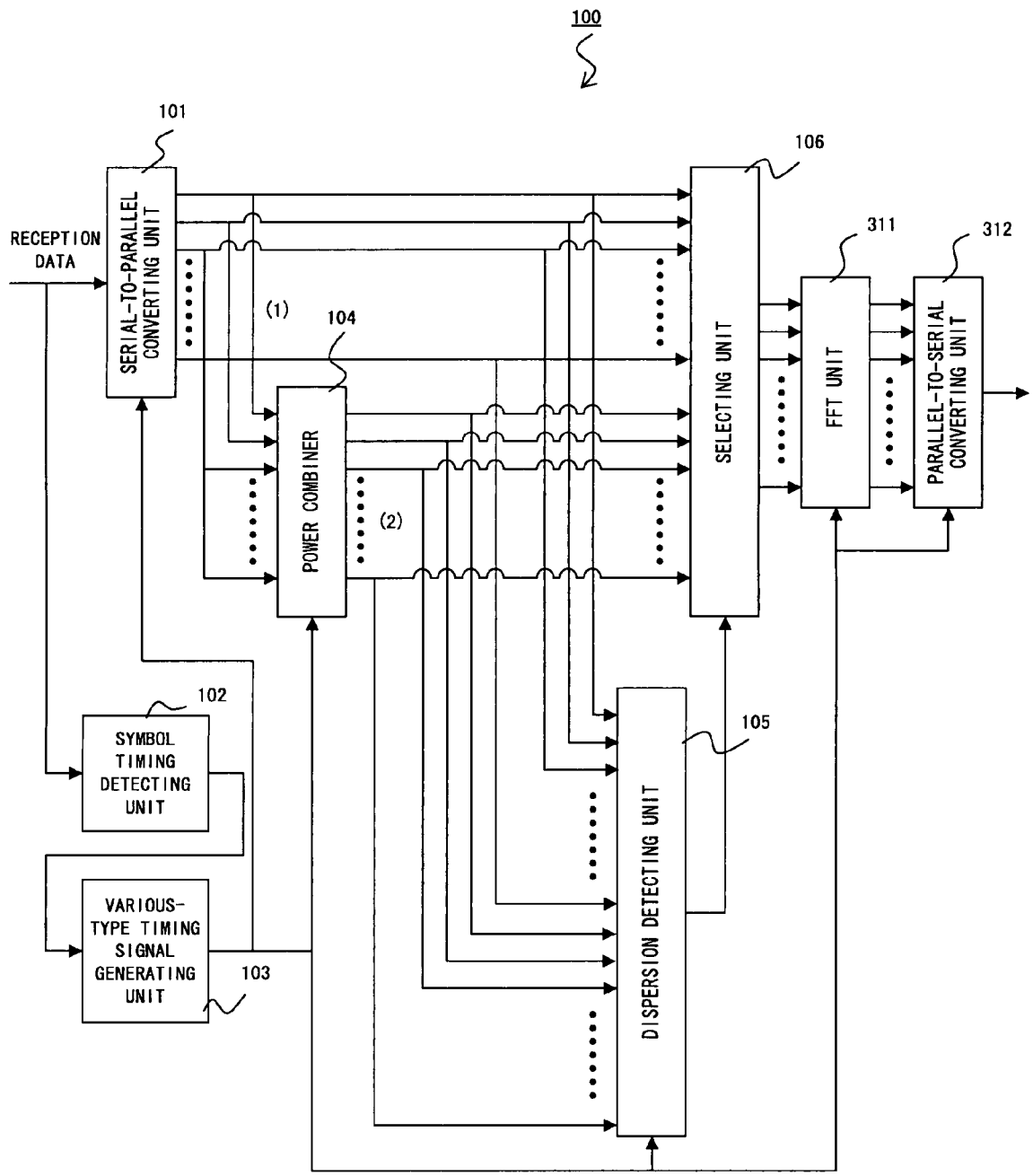
F I G. 1 1

FIG. 12B WHEN DISPERSION IS NOT MADE

FIG. 12D WHEN DISPERSION IS MADE

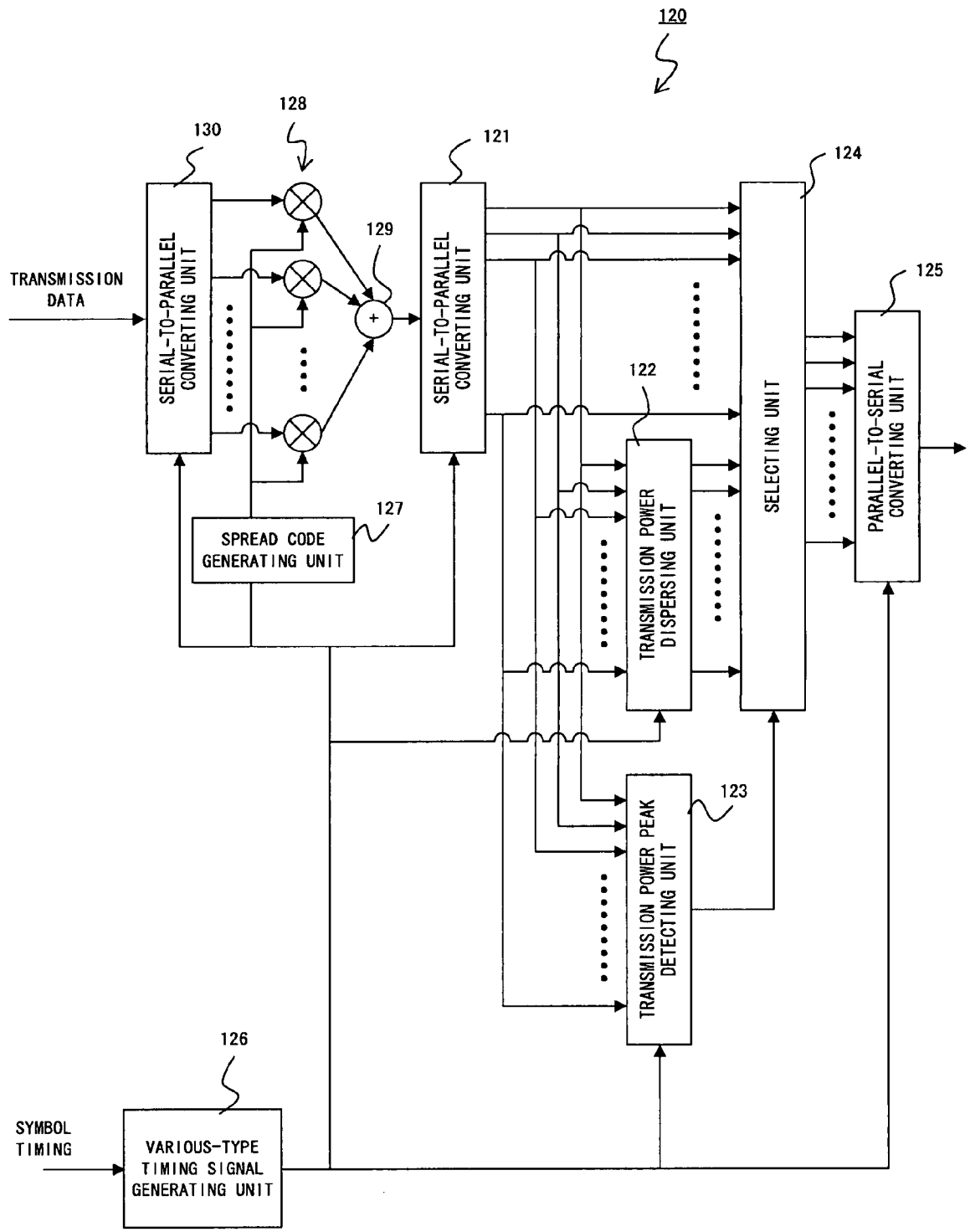
F I G. 13

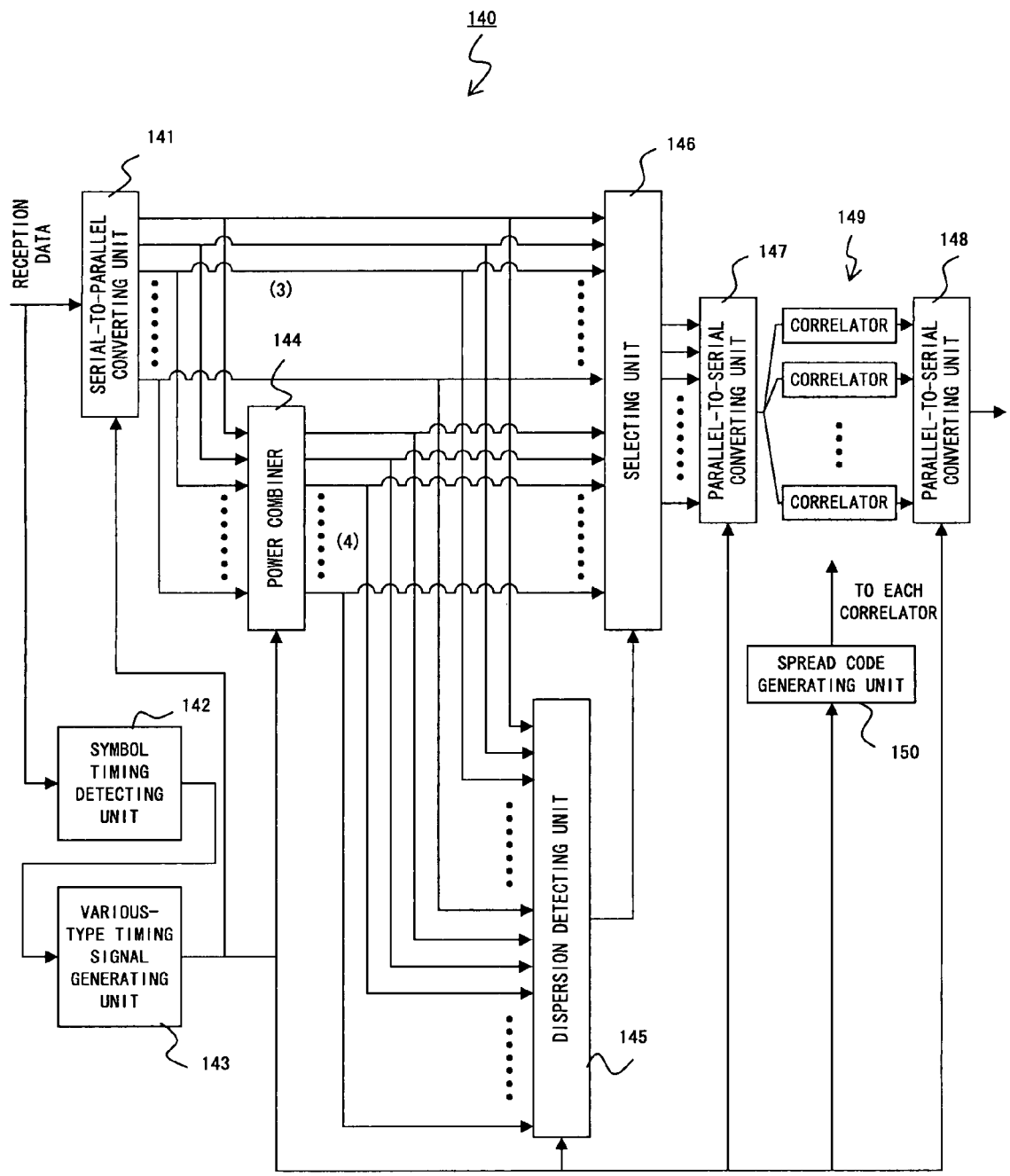
F I G. 14

FIG. 15A
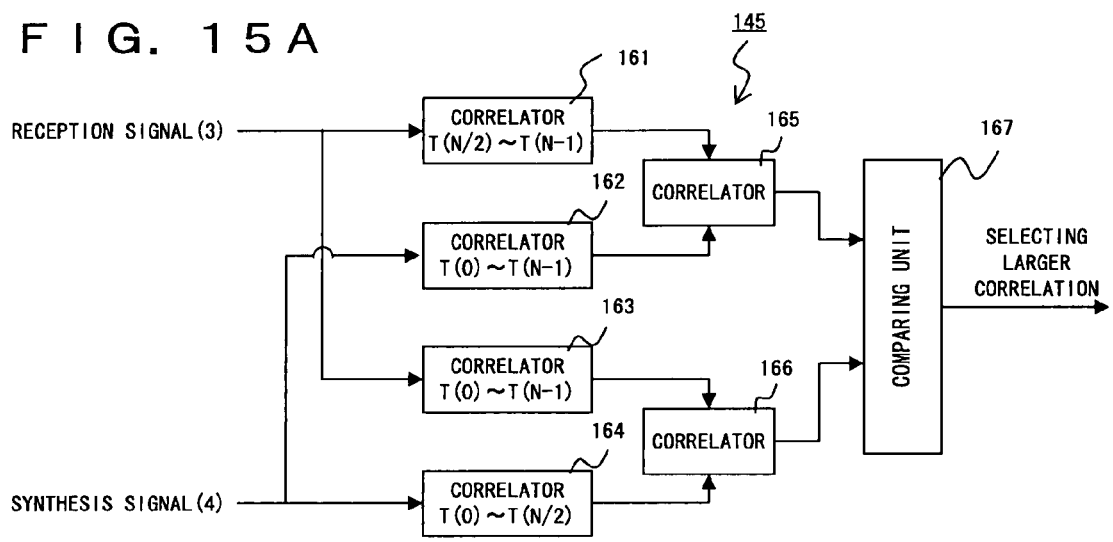
WHEN DISPERSION IS NOT MADE
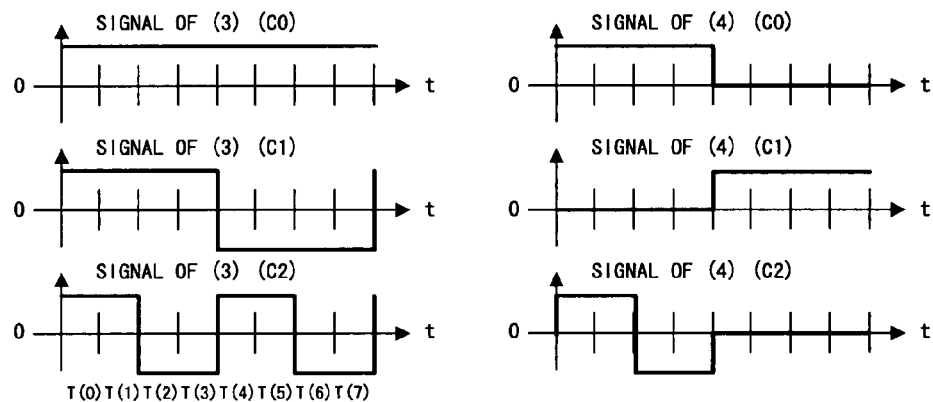
FIG. 15B      FIG. 15C
WHEN DISPERSION IS MADE
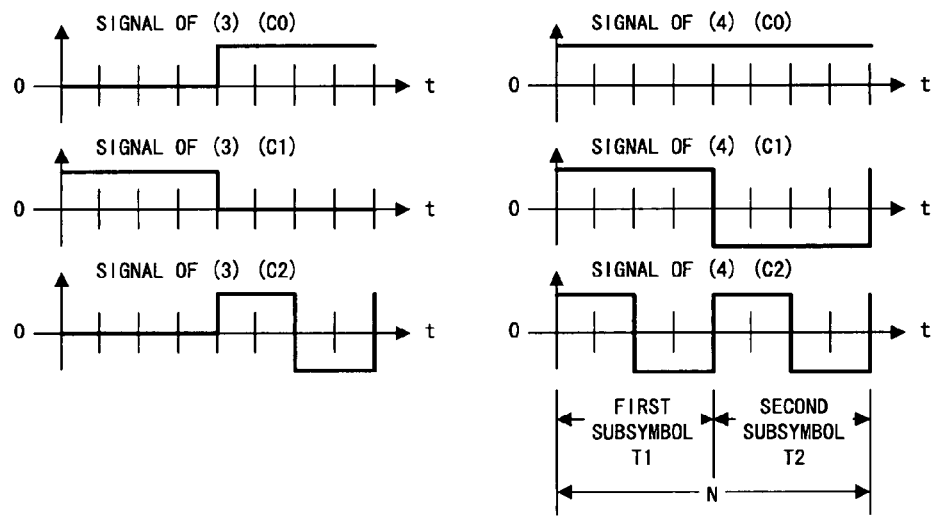
FIG. 15D      FIG. 15E

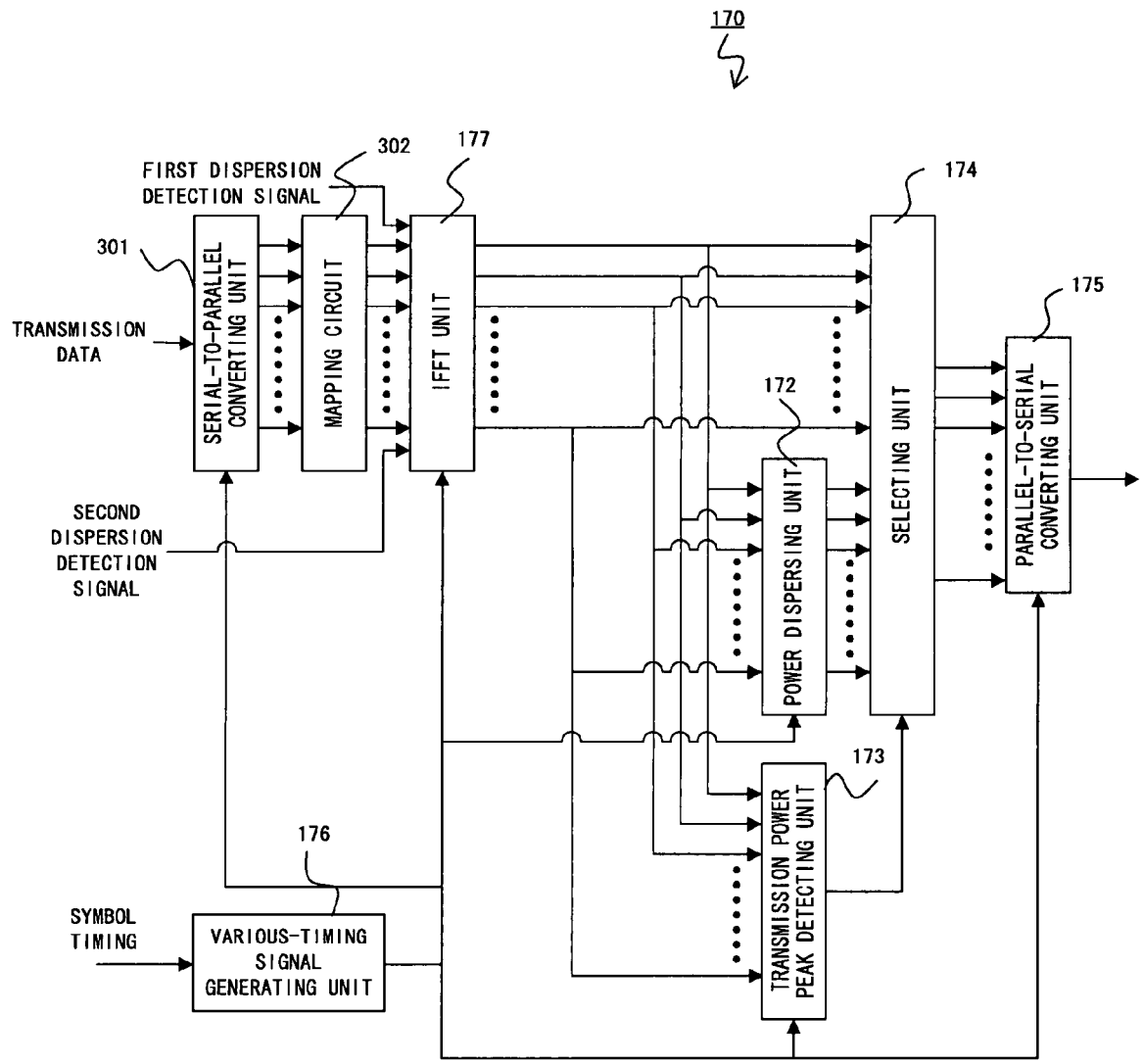
F I G. 16

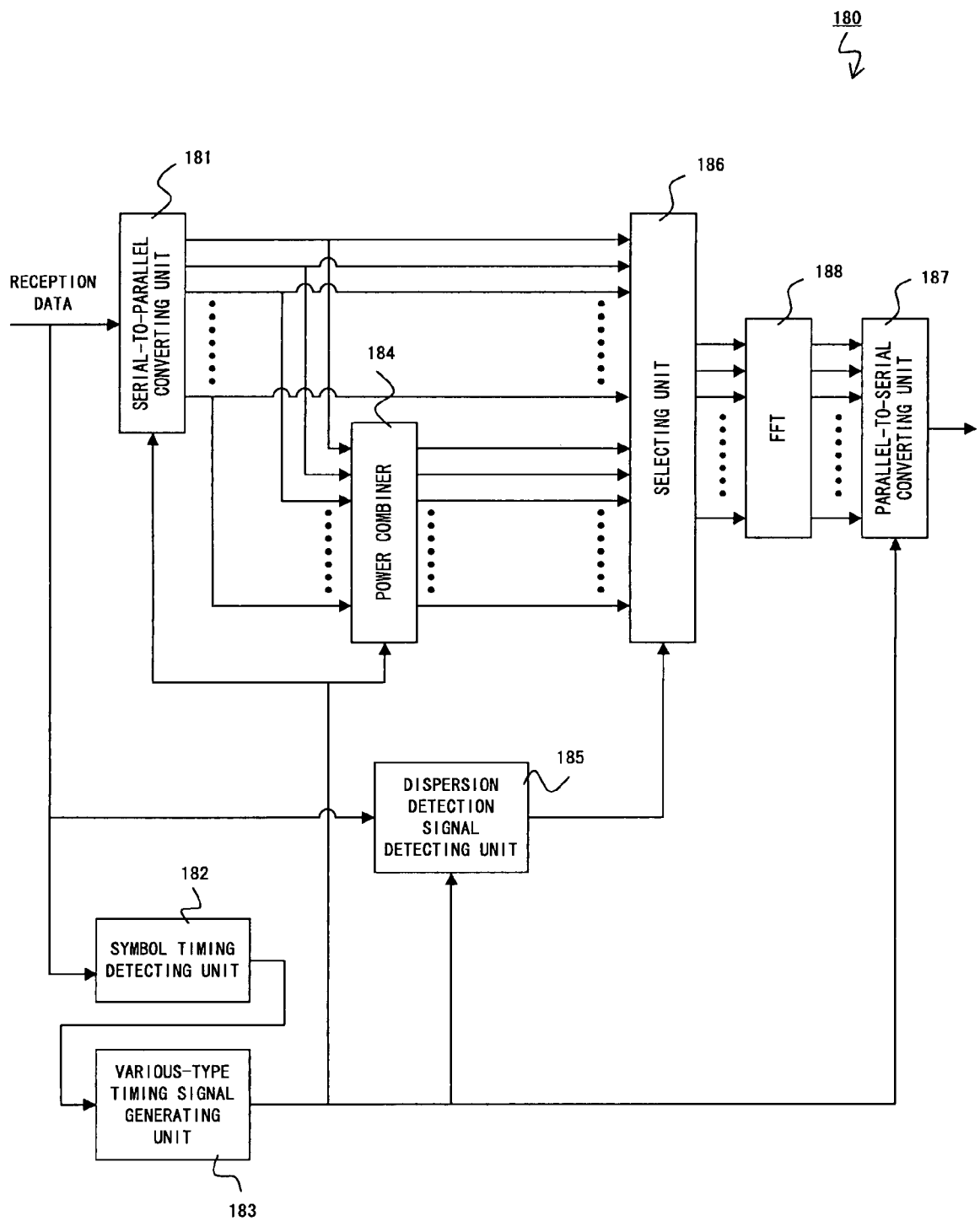
F I G. 18

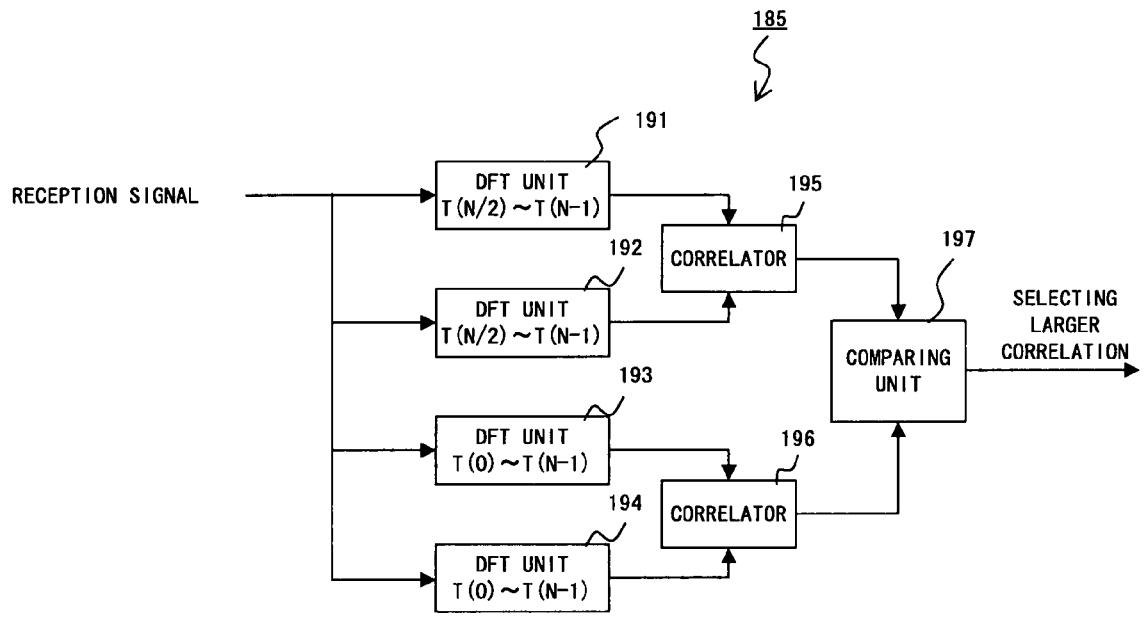
FIG. 19A
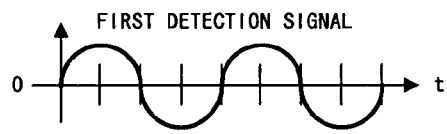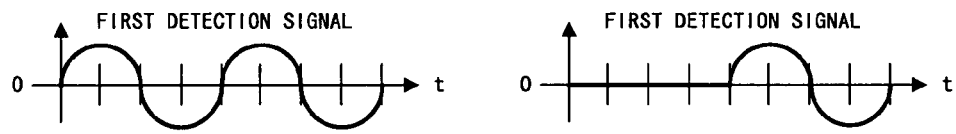
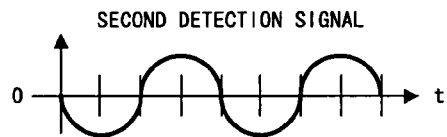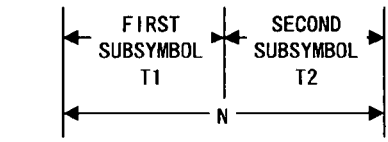
FIG. 19B    FIG. 19C

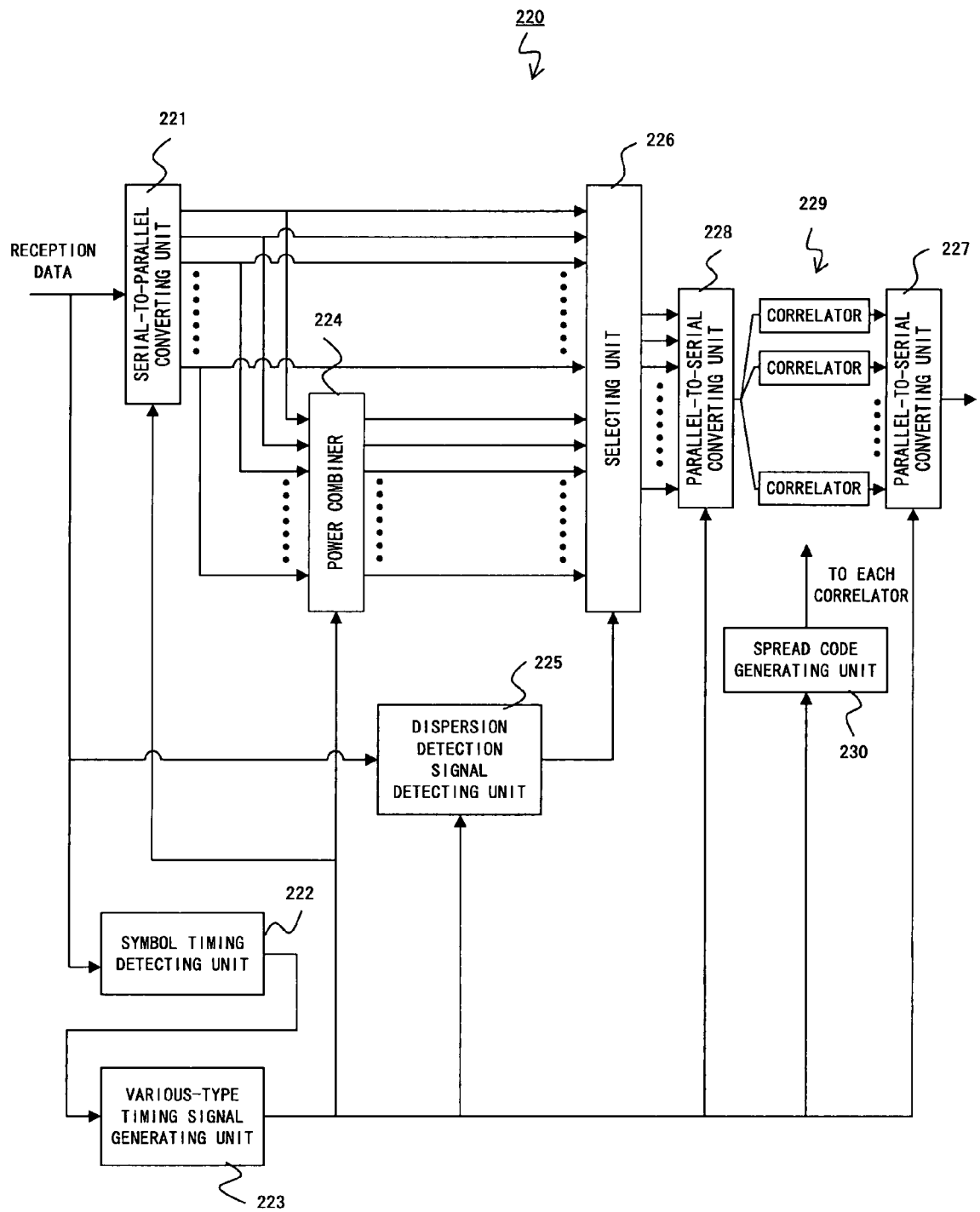
F I G. 2 1

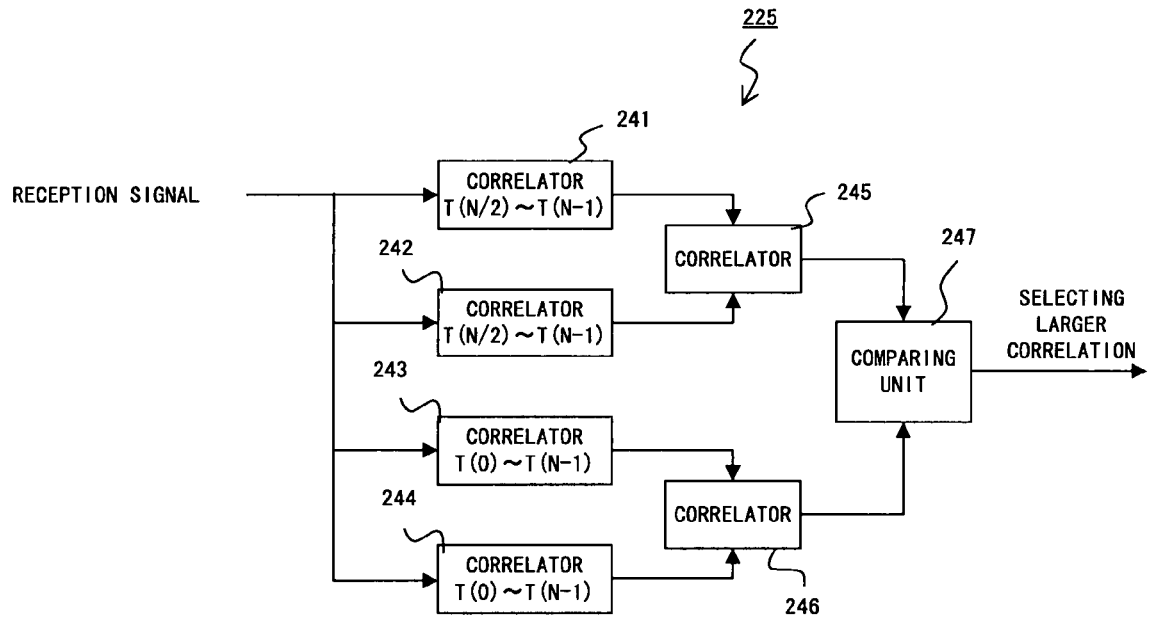
FIG. 22A
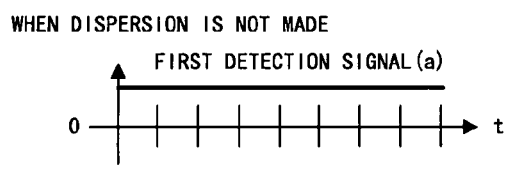
FIG. 22B
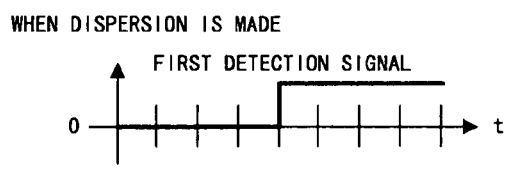
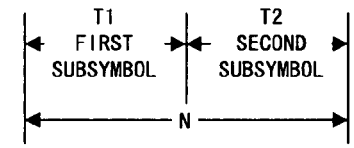
FIG. 22C

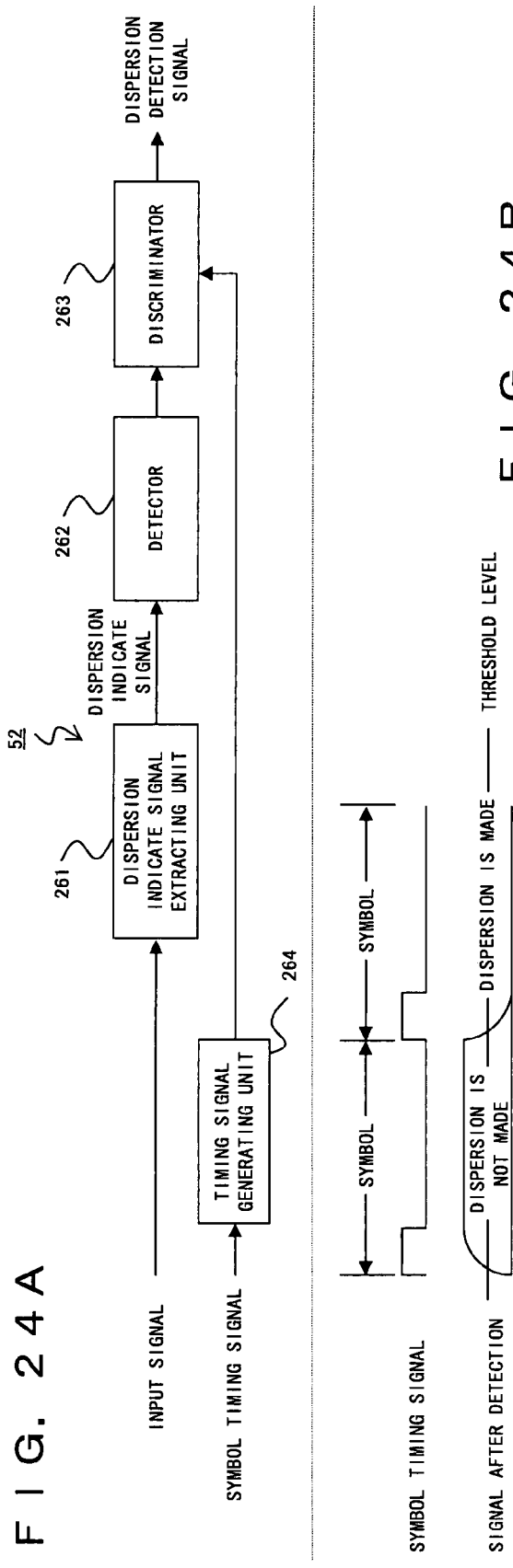
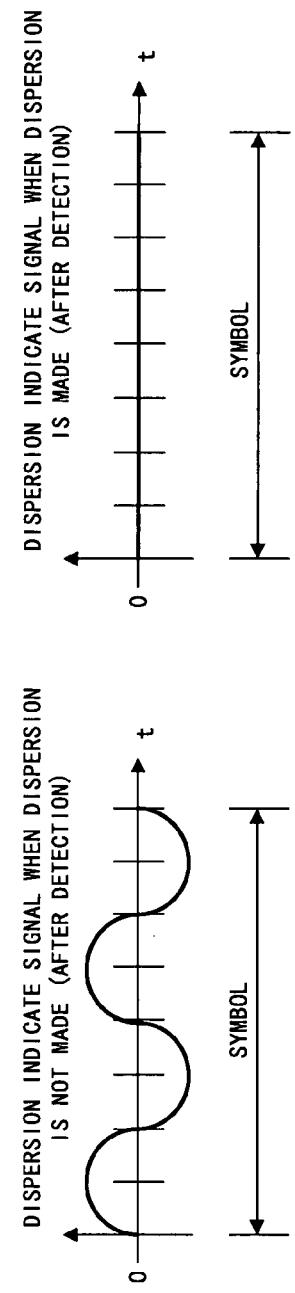
FIG. 24A
FIG. 24B
FIG. 24C
FIG. 24D

COMMUNICATIONS SYSTEM, TRANSMITTER, RECEIVER, AND COMMUNICATIONS METHOD THEREOF

CROSS-REFERENCE TO RELATED APPLICATIONS

This patent application is a continuation in part of application of the previous U.S. patent application, titled "COMMUNICATIONS SYSTEM, TRANSMITTER, RECEIVER, AND COMMUNICATIONS METHOD THEREOF", filed on Sep. 28, 2006, application Ser. No. 11/528,373, now abandoned herein incorporated by reference.

BACKGROUND OF THE INVENTION

1. Field of the Invention

The present invention relates to a communications system, etc., and more particularly, to a communications system, etc. for making a digital communication by using a frequency-division multiplexing communications method or a code-division multiplexing communications method.

2. Description of the Related Art

In a digital communications system which makes a communication by using a frequency-division multiplexing communications method or a code-division multiplexing communications method, a ratio (PAPR) of transmission peak power to transmission average power becomes large. A transmission power amplifier is designed in consideration of PAPR, leading to a problem that power consumption increases and downsizing becomes difficult.

As a conventional technique for overcoming this problem, a peak reduction technique exists.

Examples of such a conventional technique include the inventions recited in Patent Documents 1 and 2.

According to the invention recited in Patent Document 1, transmission data is OFDM-modulated in an IDFT unit to generate an OFDM signal, whether or not to require a reduction in the generated multi-carrier signal is determined, the multi-carrier signal determined to require the reduction is evenly reduced with an even reduction circuit, and a peak voltage portion is clipped with a clipping circuit, whereby the peak voltage is reduced. In this way, the clipping process is performed if transmission peak power exceeds a threshold value, thereby decreasing PAPR.

According to the invention recited in Patent Document 2, a peak cutting unit reduces a detected peak to a threshold value if the peak of an amplitude level, which is equal to or larger than the threshold value, is detected, and a switching unit outputs the signal, the peak of which is reduced, to an FFT unit.

(Patent Document 1) Japanese Published Unexamined Patent Application No. 2002-77097
(Patent Document 2) Japanese Published Unexamined Patent Application No. 2005-101975

With the conventional transmission power peak reduction technique, the clipping process is performed for a transmission signal. However, since the clipping process is a nonlinear process, inter-symbol interference, etc. can occur, which leads to a degradation of a bit error rate.

SUMMARY OF THE INVENTION

An object of the present invention is to provide a communications system, a transmitter, a receiver, etc. thereof, which can decrease PAPR without degrading a bit error rate, in consideration of the above described problems.

A communications system according to the present invention is a communications system having a transmitter and a receiver. The transmitter comprises a transmission power peak detecting unit for measuring each transmission power within a symbol, and for detecting whether or not the measured value exceeds a preset threshold value for each symbol of a multiplexed transmission sample or transmission chip, and a power dispersing unit for generating and outputting a dispersion signal by dispersing each transmission power within the symbol to a plurality of subsymbols configured by partitioning the symbol. If the transmission power peak detecting unit detects that the measured value exceeds the preset threshold value, the transmitter makes a transmission to the receiver by using the dispersion signal output from the power dispersing unit. The receiver comprises a dispersion detecting unit for detecting whether or not a reception signal is the dispersion signal for each symbol of the reception signal upon receipt of the signal transmitted from the transmitter, and a power combiner for synthesizing power dispersed to the plurality of subsymbols within the symbol if the dispersion detecting unit detects that the reception signal is the dispersion signal.

In the above described communications system, if the necessity to decrease PAPR arises, a dispersion signal is generated by dispersing each transmission power within a symbol to a plurality of subsymbols configured by partitioning the symbol, and a transmission is made to the side of the receiver by using the dispersion signal. On the side of the receiver, the power combiner restores to the original state if the reception signal is the dispersion signal. To implement this, whether or not the reception signal is the dispersion signal must be determined on the side of the receiver. The above described configuration adopts the dispersion detecting unit. However, various configurations can be considered other than the above described one.

In a first configuration, the transmitter further comprises a dispersion indicate signal generating unit for generating a dispersion indicate signal, which indicates that the transmission power within the symbol is dispersed to the plurality of subsymbols, if the transmission power peak detecting unit detects that the measured value exceeds the threshold value, and a dispersion indicate signal multiplexing unit for multiplexing the dispersion indicate signals to the transmission signal. In the meantime, the receiver further comprises a dispersion indicate signal detecting unit for extracting a dispersion indicate signal, which indicates whether or not power dispersion is made, from the reception signal, and for detecting whether or not the dispersion of transmission power is made based on the dispersion indicate signal.

Additionally, the above described communications system uses a multiplexed transmission sample or transmission chip as described above. Namely, this is a communications system which makes a communication of an OFDM modulation method or a communication of a CDM modulation method.

A second configuration is a configuration in a case of a communications system using an OFDM modulation method.

In this case, the transmitter further comprises a dispersion signal multiplexing unit for adding two dispersion detection subcarriers to a guard band or a band of unused subcarriers by using two dispersion detection signals. In the meantime, the receiver further comprises a dispersion detection signal detecting unit for detecting whether or not the dispersion of transmission power is made by using the dispersion detection subcarriers, as a replacement for the dispersion detecting unit.

A third configuration is a configuration in a case of a communications system using a CDM modulation method.

In this case, the transmitter further comprises a spreading unit for performing a spread process for two dispersion detection signals by using an unused spread code. In the meantime, the receiver further comprises a dispersion detection signal detecting unit for detecting whether or not the dispersion of transmission power is made by using the detection signals, as a replacement for the dispersion detecting unit.

BRIEF DESCRIPTION OF THE DRAWINGS

FIG. 1 is a block diagram showing a configuration of a transmitter in a first basic configuration of a digital communications system according to a preferred embodiment;

FIG. 3 is a block diagram showing a configuration of a receiver in the first basic configuration of the digital communications system according to the preferred embodiment;

FIG. 4A shows an example of a configuration of a reception power combiner;

FIG. 4B shows an example of a power distribution of a reception signal P2;

FIG. 4C shows an example of a power distribution of a synthesis signal P3;

FIG. 5 is a block diagram showing a configuration of a transmitter in a second basic configuration of the digital communications system according to the preferred embodiment;

FIGS. 6A and 6B show an example of a configuration for generating a dispersion indicate signal and various types of signals in the configuration;

FIGS. 6C and 6D show examples of the dispersion indicate signal;

FIG. 7 is a block diagram showing a configuration of a receiver in the second basic configuration of the digital communications system according to the preferred embodiment;

FIGS. 8A and 8B show examples of a configuration of a dispersion indicate signal detecting unit and various types of signals in the configuration;

FIGS. 8C and 8D show examples of a detected dispersion indicate signal;

FIG. 9 is a block diagram (No. 1) exemplifying a transmitter when this technique is applied to an OFDM modulation method;

FIG. 10 is a block diagram (No. 2) exemplifying the transmitter when this technique is applied to the OFDM modulation method;

FIG. 11 is a block diagram exemplifying a receiver when this technique is applied to the OFDM modulation method;

FIGS. 12B to 12E show examples of reception and synthesis signals when dispersion is made/not made;

FIG. 13 is a block diagram exemplifying a transmitter when this technique is applied to a CDM modulation method;

FIG. 14 is a block diagram exemplifying a receiver when this technique is applied to the CDM modulation method;

FIG. 15A is a block diagram exemplifying a configuration of a dispersion detecting unit in the receiver shown in FIG. 14;

FIGS. 15B to 15E are schematics exemplifying reception and synthesis signals when dispersion is made/not made;

FIG. 16 is a block diagram exemplifying a configuration of a transmitter in a further preferred embodiment for the OFDM modulation method;

FIG. 18 is a block diagram showing a configuration of a receiver which responds to the transmitter shown in FIG. 16;

FIG. 19A shows an example of a dispersion detecting unit of the receiver shown in FIG. 18;

FIGS. 19B and 19C show examples of a reception signal when dispersion is made/not made;

FIG. 21 is a block diagram showing a configuration of a receiver which responds to the transmitter shown in FIG. 20;

FIG. 22A shows an example of a configuration of a dispersion detection signal detecting unit in the receiver shown in FIG. 21;

FIGS. 22B and 22C show examples of a reception signal when dispersion is made/not made;

FIGS. 24A to 24D show examples of a configuration of a dispersion indicate signal detecting unit corresponding to the configuration shown in FIG. 23A, and various types of signals in the configuration.

DESCRIPTION OF THE PREFERRED EMBODIMENTS

Figure 2A:
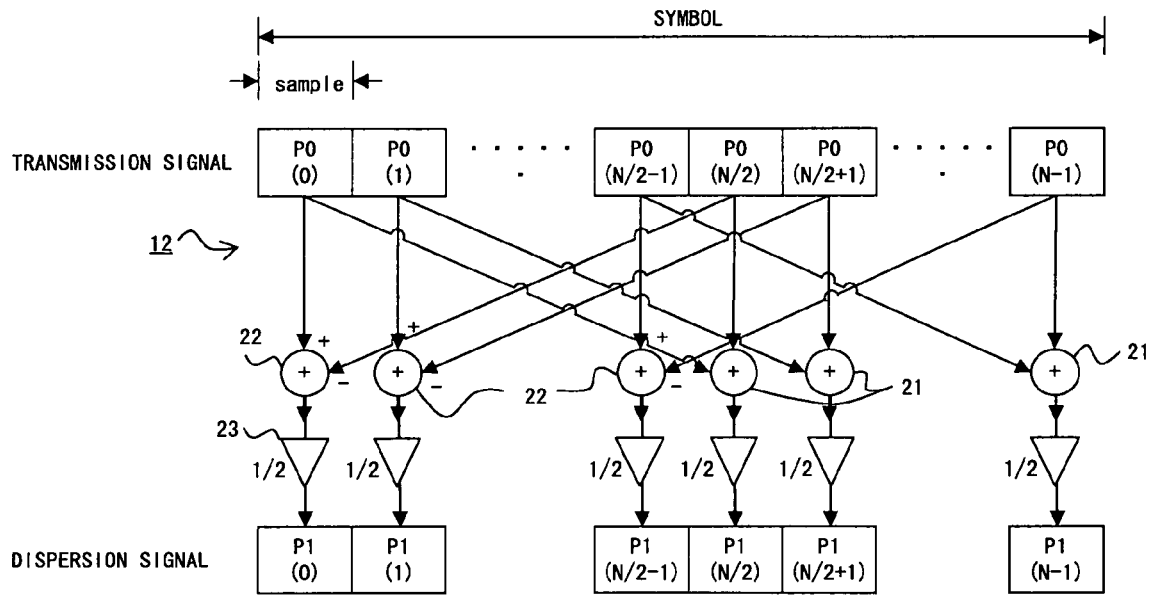
FIG. 2A shows an example of a configuration of a power dispersing unit.

Preferred embodiments according to the present invention are hereinafter described with reference to the drawings.

FIGS. 1 and 3 are block diagrams showing a first basic configuration of a digital communications system according to a preferred embodiment. The configurations of a transmitter and a receiver are respectively shown in FIGS. 1 and 3. However, only new configuration portions of the transmitter and the receiver according to the present invention are shown, and normal configurations of the transmitter and the receiver are omitted here. In this sense, the configurations shown in FIGS. 1 and 3 may be referred to as a peak power dispersing unit 10 provided within the transmitter and a peak power reverse dispersing unit 30 provided within the receiver, although they are referred to as the transmitter 10 and the receiver 30 in the following description.

The transmitter 10 shown in FIG. 1 comprises a serial-to-parallel converting unit 11, a power dispersing unit 12, a transmission power peak detecting unit 13, a selecting unit 14, a parallel-to-serial converting unit 15, and a various-type timing signal generating unit 16.

The serial-to-parallel converting unit 11, to which multiplexed transmission data (a multiplexed transmission sample (in the case of OFDM)) or a multiplexed transmission chip (in the case of CDMA)) is input, converts the data into parallel signals in units of one symbol. Each of the parallel signals is hereinafter referred to as a sample signal.

The transmission power peak detecting unit 13 measures the transmission power of each of the sample signals, detects whether or not the transmission power of at least one sample signal exceeds a preset threshold value, and outputs a detection signal to the selecting unit 14. The threshold value may be arbitrarily set to a suitable value. Preferably, the threshold value is set, for example, to "average power within one symbol", or a "value (naturally a value smaller than the total power) larger than a value obtained by subtracting an arbitrary value S (S is a value equal to or smaller than 3 (dB)) from the total power within one symbol. From another viewpoint, preferably, the threshold value is set so that the number of sample signals the transmission power of which exceeds the threshold value does not become 2 or more.

The power dispersing unit 12 disperses the transmission power within one symbol to a plurality of subsymbols. More specifically, the subsymbol is generated by partitioning the above described one symbol. In this description, one symbol is partitioned into two subsymbols. However, the number of subsymbols is not limited to two. Since one symbol is partitioned into two in this description, two subsymbols are generated. The power dispersing unit 12 disperses the transmission power of each sample signal within the above described one symbol to two subsymbols. Details of the configuration of the power dispersing unit 12 are shown in FIG. 2A, and will be described later.

The output of the serial-to-parallel converting unit 11 and that of the power dispersing unit 12 are input to the selecting unit 14. The selecting unit 14 selects and outputs either of the output signals of the serial-to-parallel converting unit 11 and the power dispersing unit 12 according to the detection signal output from the transmission power peak detecting unit 13.

The parallel-to-serial converting unit 15 converts the output signal of the selecting unit 14 into a serial signal.

The various-type timing signal generating unit 16, to which a symbol timing signal is input, generates and outputs various types of timing signals, which determine the operation timings of the above described constituent elements 11 to 13 and 15 based on the symbol timing signal. Additionally, the various-type timing signal generating unit 16 outputs various types of timing signals, which are generated based on the symbol timing signal, to the serial-to-parallel converting unit 11, the power dispersing unit 12, the transmission power peak detecting unit 13, and the parallel-to-serial converting unit 15.

The serial signal output from the parallel-to-serial converting unit 15 is transmitted to the receiver by a transmitting unit not shown.

An example of the configuration of the power dispersing unit 12 is shown in FIG. 2A.

The power dispersing unit 12 shown in this figure comprises adders 21 for outputting the sum of a plurality of sample signals, subtractors 22 for outputting a difference between a plurality of sample signals, and attenuators 23 for attenuating the power of the output signal of each of the adders 21 and each of the subtractors 22.

Here, the transmission power in units of samples is dispersed to two subsymbols as described above. Additionally, the example shown in FIG. 2A assumes that there are N sample signals P0(0) to P0 (N−1). In this case, N/2 adders 21 and N/2 subtractors 22 are provided. Here, the attenuators 23 are assumed to attenuate the power of the output signal of each of the adders 21 and each of the subtractors 22 to one half.

An addition by an adder 21 and a subtraction by a subtractor 22 are made for each pair of two arbitrary sample signals. Then, the results of the addition and the subtraction are attenuated to one half by attenuators 23.

The pair of two sample signals may be arbitrary. However, it is better to avoid pairing sample signals within the same subsymbol. As the above described pair of two sample signals, a sample signal P0(N/2+n) is made to correspond to a sample signal P0(n) (n: integer) in the example shown in FIG. 2A. Accordingly, for example, the sample signals P0(0) and P0 (N/2), and the sample signals P0(1) and P0(N/2+1) are paired respectively.

Taking the pair of the sample signals P0(0) and P0(N/2) as an example, a difference between these sample signals is obtained by a subtractor 22, and a signal obtained by attenuating the difference to one half with an attenuator 23 is output as a dispersion signal P1(0). Additionally, the sum of the sample signals P0(0) and P0 (N/2) is obtained by an adder 21, and a signal obtained by attenuating the sum to one half with an attenuator 23 is output as a dispersion signal P1 (N/2). The dispersion signals P1(0) and P1 (N/2) correspond to the first and the second subsymbols respectively. Such a process is referred to as "dispersing each transmission power (of a sample signal) within a symbol to a plurality of subsymbols", or "generating a dispersion signal".

Similarly, for the pair of sample signals P0(1) and P0(N/2+1), a difference between these sample signals is obtained by a subtractor 22, and a signal obtained by attenuating the difference to one half with an attenuator 23 is output as a dispersion signal P1(1). Additionally, the sum of the sample signals P0(1) and P0 (N/2+1) is obtained by an adder 21, and a signal obtained by attenuating the sum to one half with an attenuator 23 is output as a dispersion signal P1(N/2+1).

The above described process is performed for pairs of all of the sample signals, whereby the transmission power within one symbol can be dispersed to two subsymbols.

The above description can be represented by the following equation (1).

$$P0: \text{Power of input sample} \quad (1)$$
$$P1: \text{Power of output sample}$$
$$P1(n) = \frac{P0(n) - P0(N/2+n)}{2} \quad (n < N/2)$$
$$P1(n) = \frac{P0(n-N/2) + P0(n)}{2} \quad (n \geq N/2)$$

Figure 2B:
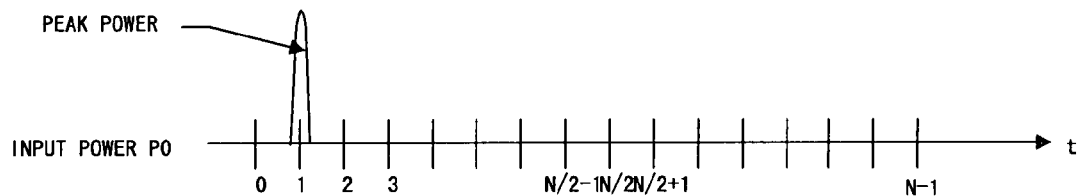
FIG. 2B shows an example of a power distribution of a transmission signal P0.

One example of the power distribution of one symbol of a transmission signal is shown in FIG. 2B. Since this figure shows the case where the transmission signal is a serial signal, a horizontal axis indicates a time t. This is similar also in FIG. 2C.

The example in FIG. 2B shows the case where the peak of power arises in the sample signal P0(1).

Figure 2C:
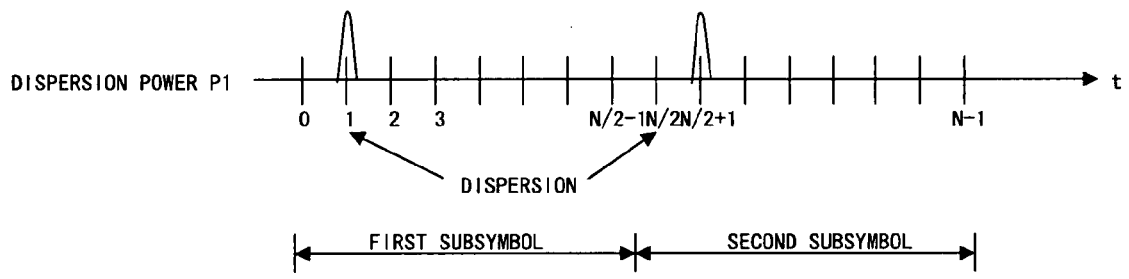
FIG. 2C shows an example of a power distribution of a dispersion signal P1.

In this case, the power of the sample signal P0(1) is dispersed to two subsymbols based on the above provided equation (1). As shown in FIG. 2C, the power of the sample signal P0(1) is dispersed to the dispersion signals P1(1) and P1(N/2+1). Then, the dispersion signal P1 having the power distribution shown in FIG. 2C is output to the selecting unit 14.

Assuming that the peak power of the sample signal P0(1) shown in FIG. 2B exceeds the above described threshold value, the transmission power peak detecting unit 13 detects that the peak power exceeds the threshold value, and outputs the detection result to the selecting unit 14. As a result, the selecting unit 14 selects the output (dispersion signal P1) of the power dispersing unit 12, and outputs the selected signal to the parallel-to-serial converting unit 15. In this case, the parallel-to-serial converting unit 15 converts this dispersion signal into a serial signal, and outputs the serial signal.

As described above, the peak power of a transmission signal can be dispersed to a plurality of subsymbols and transmitted.

FIG. 3 is a block diagram showing the configuration of the receiver as described above.

The receiver 30 shown in this figure comprises a serial-to-parallel converting unit 31, a symbol timing detecting unit 32, a various-type timing signal generating unit 33, a power combiner 34, a dispersion detecting unit 35, a selecting unit 36, and a parallel-to-serial converting unit 37.

Upon receipt of the transmission signal from the transmitter 10, the serial-to-parallel converting unit 31 converts this reception signal (referred to as a reception sample or a reception chip) into parallel signals for each symbol. The output of the serial-to-parallel converting unit 31 is input to the power combiner 34, the dispersion detecting unit 35, and the selecting unit 36. Each of the parallel signals is hereinafter referred to as a reception sample signal.

The symbol timing detecting unit 32 extracts the symbol timing signal from the reception signal, and outputs the extracted signal to the various-type timing signal generating unit 33. Operations of the various-type timing signal generating unit 33 are almost similar to those of the various-type timing signal generating unit 16 of the transmitter 10. Namely, the various-type timing signal generating unit 33 generates various types of timing signals for synchronizing the operations of the functional units within the receiver 30 based on the symbol timing signal, and outputs the generated signals to the functional units (the serial-to-parallel converting unit 31, the power combiner 34, the dispersion detecting unit 35, and the parallel-to-serial converting unit 37).

The power combiner 34 performs a process for synthesizing a plurality of sample signals regardless of whether or not the reception signal is a signal dispersed to the plurality of subsymbols, and outputs a synthesis signal resultant from the process to the selecting unit 36 and the dispersion detecting unit 35.

The dispersion detecting unit 35, to which the output signal (reception signal) of the serial-to-parallel converting unit 31 and the output signal (synthesis signal) of the power combiner 34 are input, detects whether or not the reception signal is the dispersion signal, and outputs a detection signal to the selecting unit 36.

The selecting unit 36 selects and outputs either of the output signal (reception signal) of the serial-to-parallel converting unit 31 and the output signal (synthesis signal) of the power combiner 34 according to the detection signal from the dispersion detecting unit 35. If the detection signal is a signal indicating that the reception signal is the dispersion signal, the selecting unit 36 naturally selects and outputs the output signal (synthesis signal) of the power combiner 34.

The parallel-to-serial converting unit 37 converts the output signal of the selecting unit 36 into a serial signal.

An example of the configuration of the power combiner 34 is shown in FIG. 4A.

The power combiner 34 shown in this figure comprises adders 41 for obtaining the sum of a plurality of reception sample signals, and subtractors 42 for obtaining a difference between a plurality of reception sample signals. Here, the example of the configuration is shown according to the above described example of the configuration on the side of the transmitter 10 shown in FIG. 2A. Accordingly, it is assumed that there are N reception sample signals P2(0) to P2(N−1) as shown in FIG. 4A (a signal P2 corresponds to either of the signals P0 and P1). Additionally, N/2 adders 41 and N/2 subtractors 42 are provided.

In a similar manner as in the above described case of FIG. 2A, an addition by an adder 41 and a subtraction by a subtractor 42 are made for each pair of two reception sample signals, and the outputs of the adder 41 and the subtractor 42 are output as a synthesis signal. The reception sample signals P2(0) to P2(N−1) correspond to either of the sample signals P0(0) to P0(N−1) and the dispersion signals P1(0) to P1(N−1). Namely, if the dispersion process is performed on the side of the transmitter, the reception sample signals P2(0) to P2(N−1) correspond to the dispersion signals P1(0) to P1(N−1).

As the above described pair of two sample signals, a reception sample signal P2(N/2+n) is made to correspond to a reception sample signal P2(n) (n: integer) in the example shown in FIG. 4A. Accordingly, for example, the reception sample signals P2(0) and P2(N/2), and the reception sample signals P2(1) and P2(N/2+1) are paired respectively.

Taking the pair of the reception sample signals P2(0) and P2(N/2) as an example, a difference between these reception sample signals is obtained by a subtractor 42, and output as a synthesis signal P3(N/2). Additionally, the sum of these reception sample signals is obtained by an adder 41, and output as a synthesis signal P3(0).

Similarly, for the pair of the reception sample signals P2(1) and P2(N/2+1), a difference between these reception sample signals is obtained by a subtractor 42, and output as a synthesis signal P3(N/2+1). Additionally, the sum of these reception sample signals is obtained by an adder 41, and output as a synthesis signal P3(1).

The above described process is performed for pairs of all of the reception sample signals, whereby the reception power of two subsymbols can be synthesized.

The above description can be represented by the following equation (2).

$$P2: \text{Power of reception input sample} \qquad (2)$$
$$P3: \text{Power of reception synthesis sample}$$
$$P3(n) = P2(n) + P2(N/2+n) \quad (n < N/2)$$
$$P3(n) = -P2(n-N/2) + P2(n) \quad (n \geq N/2)$$

For example, if the signal shown in FIG. 2C is received, this reception signal is a signal having a power distribution where the peak power arising in the sample signal P0(1) is dispersed to the dispersion signals P1(1) and P1 (N/2) as shown in FIG. 4B. The synthesis process represented by the above provided equation (2) is performed for this reception signal, whereby the power distribution of the synthesis signal P3 is restored to the original state as shown in FIG. 4C.

Block diagrams showing a second basic configuration of the digital communications system according to the preferred embodiment are shown in FIGS. 5 and 7. The configurations of the transmitter and the receiver are shown in FIGS. 5 and 7 respectively. Here, whether or not a reception signal is a dispersion signal must be detected on the side of the receiver as described above. The methods for detecting whether or not dispersion is made are different between the first and the second basic configurations. Conversely, the other configuration may be the same. Accordingly, the same constituent elements as those shown in FIGS. 1 and 3 are denoted with the same reference numerals in FIGS. 5 and 7, and their descriptions are omitted. The method for detecting whether or not dispersion is made in the first basic configuration will be described later.

As shown in FIG. 5, the transmitter 50 further comprises a dispersion indicate signal multiplexing unit 51 and a dispersion indicate signal generating unit 52 in addition to the configuration of the transmitter 10 shown in FIG. 1.

To the dispersion indicate signal generating unit 52, a timing signal a is input among various types of timing signals output from the various-type timing signal generating unit 16. This timing signal a is generated based on the above described symbol timing signal. Additionally, to the dispersion indicate signal generating unit 52, a detection signal b output from the transmission power peak detecting unit 13 is input. A dispersion indicate signal is generated and output based on the input signals a and b. The dispersion indicate signal is a signal indicating whether or not a transmission signal is the dispersion signal P1.

The dispersion indicate signal multiplexing unit 51 multiplexes the dispersion indicate signal to the output signal of the parallel-to-serial converting unit 15.

A block diagram of the configuration of the dispersion indicate signal generating unit 52 is shown in FIG. 6A.

This is an example where the dispersion indicate signal is generated as a BPSK signal.

The dispersion indicate signal generating unit 52 shown in FIG. 6A comprises an oscillator 61, a NOT circuit 62, switches 63 and 64, and an ON/OFF signal generating unit 65.

The oscillator 61 outputs a signal of a predetermined frequency. A signal the cycle of which is one half of a symbol length is generated and output in this example.

The timing of each symbol is determined based on the timing signal a. As shown in FIG. 6B, the falling edge of the timing signal a is the beginning of each symbol. The timing signal a is generated based on the symbol timing signal as described above. As shown in FIG. 6B, this is a signal the value of which becomes "0" (Low) in the first half of each symbol, and becomes "1" (High) in its latter half.

Here, the detection signal b becomes "1" if the transmission power of any one or more of samples exceed the threshold value for each symbol.

Two arbitrary symbols (the first and the second symbols) are shown in FIG. 6B. The detection signal b is "0" for the first symbol, and "1" for the second symbol.

The ON/OFF signal generating unit 65, to which the timing signal a and the detection signal b are input, generates and outputs an ON/OFF control signal for the switch 64 according to the input signals a and b. As shown in FIG. 6B, an ON signal is always output when the detection signal b is "0", an OFF signal is output when the detection signal b is "1" and the timing signal a is "0", and an ON signal is output when the detection signal b is "1" and the timing signal a is "1" (namely, the timing signal a is output).

Furthermore, the detection signal b serves as a switching signal for the switch 63. The switch 63 selects the side of A when the detection signal b is "0", or selects the side of B when the detection signal b is "1". When the switch 63 selects the side of A, the output signal of the oscillator 61 is selected and output. Or, when the switch 63 selects the side of B, the output (the inversion signal of the output signal of the oscillator 61) of the NOT circuit 62 is selected and output. Additionally, the output of the switch 63 is input to the switch 64.

Based on the above description, the dispersion indicate signal for the first symbol becomes the output signal of the oscillator 61 as shown in FIG. 6C. In the meantime, the dispersion indicate signal for the second symbol becomes a no signal since the switch 64 is turned off in the first subsymbol, and becomes the inversion signal of the output signal of the oscillator 61 in the second subsymbol as shown in FIG. 6D.

The above described dispersion indicate signal is generated, whereby this signal can be multiplexed to the transmission signal and the multiplexed signal can be transmitted without causing interference by the dispersion indicate signal multiplexing unit 51.

The receiver 70 shown in FIG. 7 is described next.

As shown in this figure, the configuration of the receiver 70 is almost the same as that of the receiver 30 shown in FIG. 3. However, a difference exists in a point that a dispersion indicate signal detecting unit 71 is provided as a replacement for the dispersion detecting unit 35 shown in FIG. 3.

The dispersion indicate signal detecting unit 71, to which a reception signal and a symbol timing signal output from the various-type timing signal generating unit 33 are input, outputs a detection signal, which indicates whether or not dispersion is made, to the selecting unit 36 similar to the dispersion detecting unit 35.

A block diagram of the configuration of the dispersion indicate signal detecting unit 71 is shown in FIG. 8A.

The dispersion indicate signal detecting unit 71 shown in this figure comprises a timing signal generating unit 81, a switch 82, a dispersion indicate signal extracting unit 83, an orthogonal demodulating unit 84, and a discriminator 85.

The timing signal generating unit 81 generates a timing signal c based on the input symbol timing signal. The timing signal c is the same as the above described timing signal a as shown in FIG. 8B. This signal becomes "0" in the first half of each symbol, and becomes "1" in its latter half. ON/OFF of the switch 82 is controlled according to the timing signal c. The switch 82 is turned off when the timing signal c is "0", and turned on when the timing signal c is "1". Accordingly, the first half portion (equivalent to the first subsymbol) of each symbol is not input to the dispersion indicate signal extracting unit 83, and only the latter half portion (equivalent to the second subsymbol) is input.

Accordingly, the dispersion indicate signal extracting unit 83, which is intended to extract a dispersion indicate signal from a reception signal, extracts only the portion of the dispersion indicate signal, which is equivalent to the second subsymbol, for each symbol, as shown in FIGS. 8C and 8D. Specifically, the dispersion indicate signal extracting unit 83 is a bandpass filter, etc., which makes only a particular frequency region pass through. Naturally, only the frequency component of the output signal of the oscillator 61 is made to pass through.

The extracted dispersion indicate signal is input to the orthogonal demodulating unit 84, which demodulates this signal. The polarity of the demodulation signal is discriminated by the discriminator 85, whereby whether or not dispersion is made in each symbol of the reception signal is detected.

FIG. 9 is a schematic exemplifying a configuration of the transmitter when the digital communications system having the above described first basic configuration is applied to an OFDM modulation method.

The transmitter 90 shown in this figure comprises a serial-to-parallel converting unit 91, a transmission power dispersing unit 92, a transmission power peak detecting unit 93, a selecting unit 94, a parallel-to-serial converting unit 95, a various-type timing signal generating circuit 96, a serial-to-parallel converting unit 301, a mapping circuit 302, an IFFT unit 303, and a P/S (parallel-to-serial converting) unit 304.

Since the serial-to-parallel converting unit 301, the mapping circuit 302, the IFFT unit 303, and the P/S (parallel-to-serial converting) unit 304 are normal constituent elements in an existing transmitter which adopts an OFDM method, their descriptions are not particularly provided. With these constituent elements 301 to 304, the above described multiplexed transmission sample is generated. Namely, the constituent elements 301 to 304 generate and output, what is called, an OFDM signal (A serial signal for which normal OFDM modulation processes such as a mapping process, an IFFT process, etc. are performed. This signal is configured by a plurality of digital modulation signals having different carrier frequencies, and an orthogonal relationship exists among the carriers). This OFDM signal is equivalent to the multiplexed transmission sample shown in FIG. 1, etc.

The serial-to-parallel converting unit 91, the transmission power dispersing unit 92, the transmission power peak detecting unit 93, the selecting unit 94, the parallel-to-serial converting unit 95, and the various-type timing signal generating circuit 96 are configured to carry out functions almost similar to those of the serial-to-parallel converting unit 11, the transmission power dispersing unit 12, the transmission power peak detecting unit 13, the selecting unit 14, the parallel-to-serial converting unit 15, and the various-type timing signal generating unit 16. Their functions are briefly described below.

The serial-to-parallel converting unit 91 converts the OFDM signal from serial to parallel for each symbol (OFDM symbol).

The transmission power dispersing unit 92, to which the output of the serial-to-parallel converting unit 91 is input, disperses the transmission power for one symbol to a plurality of subsymbols. The transmission power peak detecting unit 93 detects the peak power of the OFDM symbol, determines whether or not the peak power exceeds a preset threshold value, and outputs a determination result to the selecting unit 94 as a selection signal. The selecting unit 94 selects and outputs either of the output signal of the serial-to-parallel converting unit 91 and that of the transmission power dispersing unit 92 according to the selection signal. The parallel-to-serial converting unit 95 converts the output signal of the selecting unit 94 into a serial signal.

As described above, if the transmission peak power which exceeds the threshold value is detected, the transmission power is dispersed to a plurality of subsymbols and transmitted, whereby PAPR can be decreased.

However, in the configuration shown in FIG. 9, the output signal (parallel signal) of the IFFT unit 303 is only restored to the parallel signal immediately by the serial-to-parallel converting unit 91 after being converted into a serial signal by the P/S unit 304. Therefore, it can be said that the P/S unit 304 and the serial-to-parallel converting unit 91 are unnecessary. Accordingly, in the configuration shown in FIG. 9, the P/S unit 304 and the serial-to-parallel converting unit 91 may be removed, and the output signal of the IFFT unit 303 may be used as a replacement for the output signal of the serial-to-parallel converting unit 91. Namely, a configuration shown in FIG. 10 may be adopted as a replacement for the configuration shown in FIG. 9.

In FIG. 10, the same constituent elements as those shown in FIG. 9 are denoted with the same reference numerals. As shown in FIG. 10, the transmitter comprises the serial-to-parallel converting unit 301, the mapping circuit 302 and the IFFT unit 303, the P/S unit 304 and the serial-to-parallel converting unit 91 are removed, and the output signal of the IFFT unit 303 is input to the transmission power dispersing unit 92, the transmission power peak detecting unit 93, and the selecting unit 94 as the sample signal.

As an example of a configuration for an OFDM method, constituent elements, which relate to unnecessary serial-to-parallel conversion and parallel-to-serial conversion, are removed from the configuration due to a reason similar to that of FIG. 10. Additionally, existing constituent elements are omitted in some cases. For example, in FIG. 11, an FFT unit 311 and a parallel-to-serial converting unit 312 are normal constituent elements in an existing receiver using an OFDM method, and an existing reverse-mapping processing unit, etc. are omitted.

FIG. 11 is a block diagram showing the configuration of a receiver 100, which receives the transmission signal from the transmitter 90 shown in FIG. 9.

The receiver 100 shown in this figure comprises a serial-to-parallel converting unit 101, a symbol timing detecting unit 102, a various-type timing signal generating unit 103, a power combiner 104, a dispersion detecting unit 105, a selecting unit 106, the FFT unit 311, and the parallel-to-serial converting unit 312.

The serial-to-parallel converting unit 101, the symbol timing detecting unit 102, the various-type timing signal generating unit 103, the power combiner 104, the dispersion detecting unit 105, and the selecting unit 106 are configured to carry out functions almost similar to those of the corresponding constituent elements 31 to 36 shown in FIG. 3, and their descriptions are not particularly provided.

Additionally, since the FFT unit 311 and the parallel-to-serial converting unit 312 are existing constituent elements as described above, their descriptions are not particularly provided.

Figure 12A:
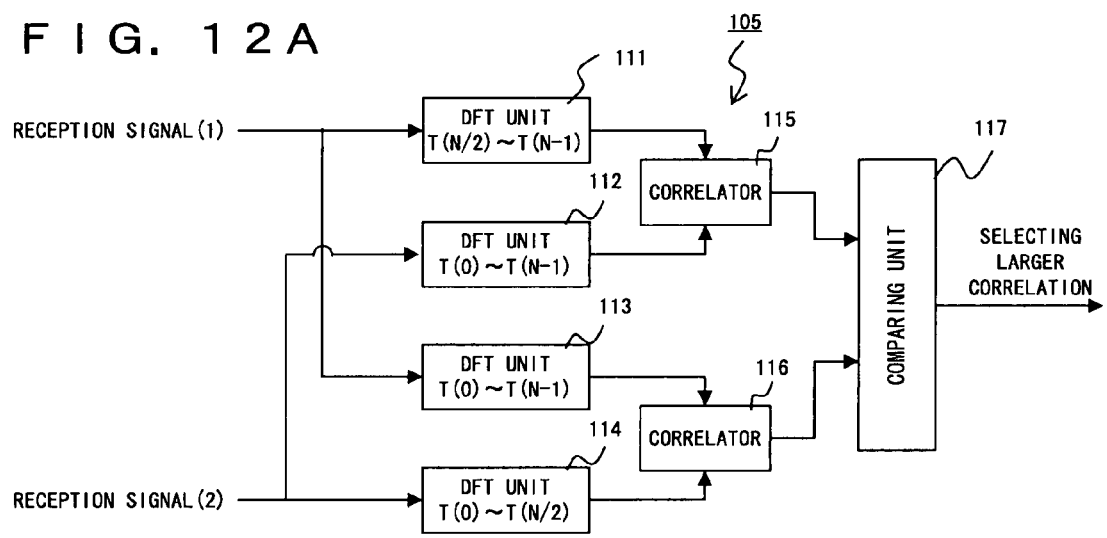
FIG. 12A is a block diagram exemplifying a configuration of a dispersion detecting unit in the receiver shown in FIG. 11.

An example of the configuration of the dispersion detecting unit 105 is shown in FIG. 12A.

The dispersion detecting unit 105 shown in this figure comprises DFT units 111, 112, 113, and 114, correlators 115 and 116, and a comparing unit 117. The DFT units 111, 112, 113, and 114, to each of which either of the reception signal (1) and the synthesis signal (2) shown in FIG. 11 is input, respectively perform a DFT (Discrete Fourier Transform) process under a predetermined condition by targeting any one of even-numbered subcarriers (either of f0 and f2 is targeted in the example shown in FIG. 12A. A target subcarrier is predetermined, and all of the DFT units 111, 112, 113, and 114 target the same subcarrier). Namely, the basic function of the DFT units 111, 112, 113, and 114 is to perform a normal DFT process (a process for extracting a particular frequency component with Discrete Fourier Transform), but the following conditions are imposed.

(a) The above described particular frequency component is defined to be any one of the even-numbered subcarriers.

(b) The DFT process is not always performed for one symbol. Namely, the DFT units 112 and 113 perform the process for one symbol. However, the DFT unit 111 performs the process for the latter half (second subsymbol time T2) of one symbol, and the DFT unit 114 performs the process for the first half (first subsymbol time T1) of one symbol.

Actually, the reception signal (1) and the synthesis signal (2) are parallel signals, and T(0), T(N/2), T(N−1), etc., which are shown in FIG. 12A, indicate the respective signals (indicating the reception sample signals, but referred to as samples here) of the parallel signals. The parallel signals such as the reception signal (1) and the synthesis signal (2) are respectively composed of N samples T(0) to T(N−1). Accordingly, all of the samples T(0) to T(N−1) are input to the DFT units 112 and 113, which then perform the DFT process (referred to as "performing the DFT process in an OFDM symbol time N" in a description to be provided later). In the meantime, only the samples T(N/2) to T(N−1) are input to the DFT unit 111, which then performs the DFT process. Since N=8 in this example, only the samples T(4) to T(7) are input to perform the DFT process (referred to as "performing the DFT process in a second subsymbol time T2" in the description to be provided later). Similarly, in this example, only the samples T(0) to T(3) are input to the DFT unit 114, which then performs the DFT process (referred to as "performing the DFT process in a first subsymbol time T1" in the description to be provided later).

Note that an "even-numbered subcarrier" is an expression in the case where the first subcarrier f0 is handled as the 0th subcarrier, which is handled as an even-numbered subcarrier. If the first subcarrier f0 is handled as the 1st subcarrier, it can be said that any one of odd-numbered subcarriers is handled as a process target.

Accordingly, if another way of definition is used, it can be said that the above described f0, f2, etc. are "signals repeated in a cycle of N/2 in normal cases". Since these signals are "signals repeated in the cycle of N/2", the waveforms of the first and the second subsymbols of such signals become identical. Additionally, "in normal cases" means a case of a reception signal in an existing configuration to which the present invention is not applied. In other words, this means the "reception signal (1) when dispersion is not made". The "reception signal (1) when dispersion is not made" is shown in FIG. 12B. As is evident from FIG. 12B, the waveforms of the first and the second subsymbols in f0 and f2 are identical. In the meantime, the waveforms of the first and the second subsymbols in f1 are different.

Based on the above description, the subcarrier, which is the "signal repeated in the cycle of N/2", is referred to as an "even-numbered subcarrier" in the following description.

Firstly, the DFT unit 111, to which the output of the serial-to-parallel converting unit 101 (hereinafter referred to as the reception signal (1)) is input, performs the DFT (Discrete Fourier Transform) process in the second subsymbol time T2 for a particular even-numbered subcarrier of the reception signal (1).

The DFT unit 113, to which the reception signal (1) is input, performs the DFT process in the OFDM symbol time N for the particular even-numbered subcarrier.

The DFT unit 112, to which the output signal of the power combiner 104 (hereinafter referred to as the synthesis signal (2)) is input, performs the DFT process in the OFDM symbol time N for the particular even-numbered subcarrier of the synthesis signal (2).

The DFT unit 114, to which the synthesis signal (2) is input, performs the DFT process in the first subsymbol time T1 for the particular even-numbered subcarrier of the synthesis signal (2).

The correlator 115 detects a correlation value between the outputs of the DFT units 111 and 112.

The correlator 116 detects a correlation value between the outputs of the DFT units 113 and 114.

The comparing unit 117 makes a comparison between the correlation values respectively detected by the correlators 115 and 116. The comparing unit 117 outputs to the selecting unit 106 a signal, which indicates that dispersion is made, if the correlation value of the correlator 115 is larger, or outputs to the selecting unit 106 a signal, which indicates that dispersion is not made, if the correlation value of the correlator 116 is larger.

An example of the reception signal (1) when the dispersion process is not performed on the side of the transmitter is shown in FIG. 12B as described above. Here, for ease of explanation, the reception signal (1) is divided and shown by subcarrier components. Actually, the reception signal (1) is naturally in a state where these subcarrier components are multiplexed. This is similar also in FIGS. 12C to 12E, and in FIGS. 15B to 15E, which will be described later.

In the examples shown in FIGS. 12B to 12E, the signal f0 is a signal of frequency 0, the signal f1 is a signal of basic frequency having a cycle 1/f1=symbol length, and the signal f2 is a signal of frequency (f2=2×f1) double the basic frequency. In this sense, the "even-numbered subcarrier" to be processed may be rephrased as a "subcarrier having a frequency of an even-numbered multiple (including also 0) of the basic frequency".

To simplify the drawings, only 3 channels f0 to f2 are shown. However, other subcarriers may exist as a matter of course (their frequencies are naturally an integral multiple of the basic frequency (n×f1; n=3, 4, 5, . . . )). The signals f0, f2, etc. are even-numbered subcarriers, whereas the signal f1, etc. are odd-numbered subcarriers.

The normal OFDM reception signal (1) is shown in FIG. 12B as described above.

In this case, if the DFT process is performed in the OFDM symbol time N within the DFT unit 113 by targeting one of the even-numbered subcarriers, inter-subcarrier interference does not occur (as a matter of course). In the meantime, if the DFT process is performed in the second subsymbol time T2 within the DFT unit 111, inter-subcarrier interference is exerted. In the example shown in FIG. 12B, the DFT units 111, 112, 113, and 114 output "1" if inter-subcarrier interference does not occur, and outputs a value other than "1" if inter-subcarrier interference is exerted.

Figure 12C:
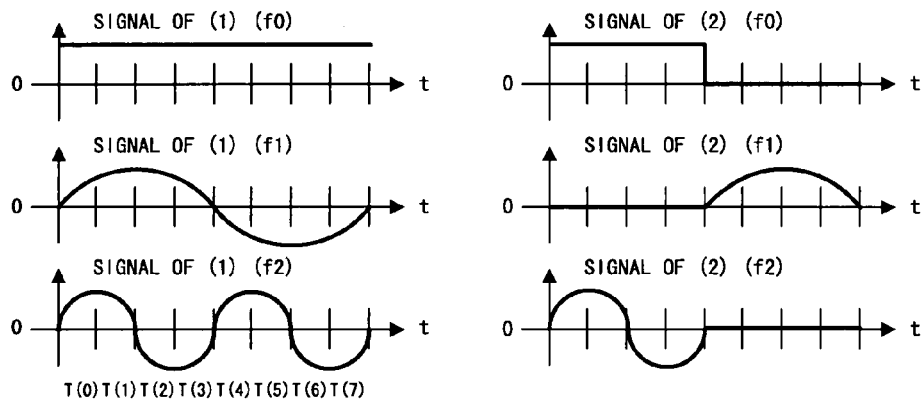

The synthesis signal (2), which is generated by the power combiner 104 based on the reception signal (1) when the dispersion process is not performed on the side of the transmitter, is shown in FIG. 12C.

In this case, if the DFT process is performed in the first subsymbol time T1 within the DFT unit 114 by targeting one of the even-numbered subcarriers, inter-subcarrier interference does not occur.

In the meantime, if the DFT process is performed in the OFDM symbol time N within the DFT unit 112 by targeting one of the even-numbered subcarriers, inter-subcarrier interference is exerted.

As described above, if the dispersion process is not performed on the side of the transmitter, inter-subcarrier interference is not exerted on the results of the DFT processes performed by the DFT units 113 and 114, so that the correlation value detected by the correlator 116 becomes 1. In the meantime, inter-subcarrier interference is exerted on the results of the DFT processes performed by the DFT units 111 and 112, so that the correlation value detected by the correlator 115 does not become 1 (correlation value<1).

Accordingly, the signal, which indicates that dispersion is not made, is output from the comparing unit 117 as described above.

Note that the functions of the correlators 115 and 116 are the same as those of correlators 165 and 166, which will be described later.

Figure 12E:
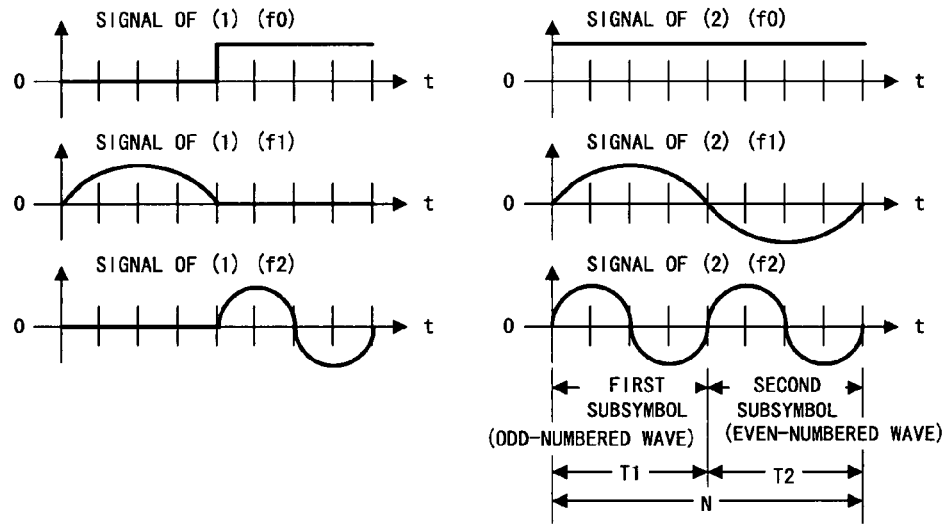

An example of the signals of the subcarriers of the reception signal (1) when the dispersion process is performed on the side of the transmitter is shown in FIG. 12D. As shown in this figure, the even-numbered subcarriers are in a state of a no signal in the first subsymbol, whereas the odd-numbered subcarrier is in a state of a no signal in the second subsymbol. Additionally, the synthesis signal (2), which is generated by the power combiner 104 based on the reception signal (1) when the dispersion process is performed on the side of the transmitter, becomes the same as that shown in FIG. 12B (naturally because the signal is restored to the original state) as shown in FIG. 12E.

Accordingly, if the dispersion process is performed on the side of the transmitter, inter-subcarrier interference is not exerted on the results of the DFT processes performed by the DFT units 111 and 112, so that the correlation value detected by the correlator 115 becomes 1. In the meantime, inter-subcarrier interference is exerted on the results of the DFT processes performed by the DFT units 113 and 114, so that the correlation value detected by the correlator 116 does not become 1 (correlation value<1).

Accordingly, the signal, which indicates that dispersion is made, is output from the comparing unit 117 as described above.

The signals shown in FIG. 12B become those shown in FIG. 12D by the circuit shown in FIG. 2. For example, if a result of an addition made by an adder 21 is considered for the respective subcarrier components (P0(1) and P0(N/2+1) are assumed to be equivalent to T(1) and T(5)) by taking the pair of P0(1) and P0 (N/2+1) shown in FIG. 2 as an example, the results of both of the subcarriers f0 and f2 are positive, but the results of the subcarrier f1 are positive and negative (their absolute values are the same). Therefore, the signal T(5) of the subcarrier f1 becomes 0 as a result of the addition as shown in FIG. 12D.

FIG. 13 shows an example of the configuration of a transmitter when the digital communications system having the first basic configuration is applied to a CDM modulation method.

The transmitter 120 shown in this figure comprises a serial-to-parallel converting unit 121, a transmission power dispersing unit 122, a transmission power peak detecting unit 123, a selecting unit 124, a parallel-to-serial converting unit 125, and a various-type timing signal generating unit 126, a spread code generating unit 127, spreaders 128, a synthesizer 129, and a serial-to-parallel converting unit 130.

The serial-to-parallel converting unit 121, the transmission power dispersing unit 122, the transmission power peak detecting unit 123, the selecting unit 124, the parallel-to-serial converting unit 125, and the various-type timing signal generating unit 126 are configured to carry out functions almost similar to those of the above described serial-to-parallel converting unit 11, power dispersing unit 12, transmission power peak detecting unit 13, selecting unit 14, parallel-to-serial converting unit 15, and various-type timing signal generating unit 16, and their descriptions are not particularly provided.

Additionally, the spread code generating unit 127, the spreaders 128, the synthesizer 129, and the serial-to-parallel converting unit 130 are merely normal constituent elements of a CDMA transmitter. Therefore, they are briefly described below.

The serial-to-parallel converting unit 130 converts transmission data into parallel signals, and outputs the parallel signals to the respective spreaders 128. The respective spreaders 128 perform a spread process for the output signals from the serial-to-parallel converting unit 130 by using any of spread codes (orthogonal codes) generated by the spread code generating unit 127. The synthesizer 129 synthesizes the outputs of the spreaders 128. The serial-to-parallel converting unit 121, to which the output (multiplexed transmission chip) of the synthesizer 129 is input, converts the transmission chip into parallel signals for each symbol.

FIG. 14 is a block diagram showing the configuration of a receiver which receives the transmission signal from the transmitter 120 shown in FIG. 13.

The receiver 140 shown in this figure comprises a serial-to-parallel converting unit 141, a symbol timing detecting unit 142, a various-type timing signal generating unit 143, a power combiner 144, a dispersion detecting unit 145, a selecting unit 146, and a parallel-to-serial converting unit 147. These constituent elements are configured to carry out functions almost similar to those of the corresponding constituent elements 31 to 37 shown in FIG. 3, and their descriptions are not particularly provided.

The receiver 140 shown in this figure further comprises a parallel-to-serial converting unit 148, correlators 149, and a spread code generating unit 150. These constituent elements are merely normal constituent elements of a CDMA receiver. Therefore, they are briefly described below.

The output of the parallel-to-serial converting unit 147 is input to each of the correlators 149. The spread code generating unit 150 generates a replica of a spread code. Each of the correlators 149 performs a despread process by using any of the spread codes generated by the spread code generating unit 150 to detect a correlation. The parallel-to-serial converting unit 148 converts the output signals of the correlators 149 into a serial signal.

FIGS. 15A to 15E show the details of the configuration of the dispersion detecting unit 145 shown in FIG. 14.

The dispersion detecting unit 145 shown in this figure comprises correlators 161, 162, 163, 164, 165, and 166, and a comparing unit 167.

To the correlators 161 and 163, the output signal (hereinafter referred to as a reception signal (3)) of the serial-to-parallel converting unit 141 is input. To the correlators 162 and 164, the output signal (hereinafter referred to as a synthesis signal (4)) of the power combiner 144 is input.

Functions of the correlators 161, 162, 163, and 164 are similar to those of the correlators (correlators 149) used on the side of the receiver in a CDMA communication. However, a difference from the correlators 149 exists in a point that the correlators 161 to 164 use not an arbitrary spread code but a particular orthogonal code and does not perform an integration/division process in a symbol time in all cases as will be described later although the correlators 149 perform the despread process using an arbitrary spread code, performs an integration process in a symbol time, and performs a process for dividing an integration result by the symbol time.

Namely, the correlators 161 to 164, to which the reception signal (3) or the synthesis signal (4), which is a multiplexed chip, and a particular code are input, perform a correlation process under respective conditions (any of N, T1, and T2, which will be described later). The above described particular code is a particular code in an orthogonal code (Walsh code) sequence generated by the spread code generating unit 127. This particular code (particular orthogonal code) may be any code as far as the code satisfies conditions to be described below, but all of the correlators 161 to 164 use the same code.

The condition of the code regarded as the particular code is to be a code which is a repetition of the same code in a cycle of N/2. This is described below with a specific example.

An example of a Walsh matrix (N=8) used by the spread code generating unit 127 is provided below.

$$W_g = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix} \quad (3)$$

The following 4 codes correspond to the code which is a repetition of the same code in the cycle of N/2 among the codes in the example of the above Walsh matrix.

$$W_8^0 = [1 \ 1 \ 1 \ 1 \ 1 \ 1 \ 1 \ 1]$$
$$W_8^3 = [1 \ 1 \ -1 \ -1 \ 1 \ 1 \ -1 \ -1]$$
$$W_8^4 = [1 \ -1 \ -1 \ 1 \ 1 \ -1 \ -1 \ 1]$$
$$W_8^7 = [1 \ -1 \ -1 \ 1 \ 1 \ -1 \ -1 \ 1]$$
(4)

As shown above, for example, the code [1 1 −1 −1 1 1 −1 −1] is proved to be a repetition of "1 1 −1 −1" in the cycle of N/2.

Accordingly, in this example, as a code sequence input to the correlators 161 to 164, any one of the above 4 codes is selected (any one may be used, but all of the correlators 161 to 164 must use the same code sequence). The following description is provided with a specific example by assuming that the code [1 1 1 1 1 1 1 1] is input to all of the correlators 161 to 164, which then perform a correlation process between this code [1 1 1 1 1 1 1 1] and the input signal (the reception signal (3) or the synthesis signal (4)). In this case, N is equal to 8 in N sample signals to be described later as a matter of course.

Based on the above description, performing the spread process using an orthogonal code such as Walsh code, etc. is a prerequisite on the side of the transmitter in this technique.

The correlator 161, to which the reception signal (3) is input, performs the correlation process in the second subsymbol time T2, and the correlator 163, to which the reception signal (3) is input, performs the correlation process in the symbol time N. Additionally, the correlator 162, to which the synthesis signal (4) is input, performs the correlation process in the symbol time N, and the correlator 164, to which the synthesis signal (4) is input, performs the correlation process in the first subsymbol time T1.

Actually, the reception signal (3) and the synthesis signal (4) are parallel signals, and T(0), T(N/2), T(N−1), etc., which are shown in FIG. 15A, indicate the respective signals (referred to as samples) of the parallel signals. The parallel signals such as the reception signal (3) and the synthesis signal (4) are respectively composed of N samples T(0) to T(N−1) Accordingly, for example, "inputting the reception signal (3) to perform the correlation process in the second subsymbol time T2" means that only the samples T(N/2) to T(N−1) among the samples T(0) to T(N−1) of the reception signal (3) are input to perform the correlation process. Since N is equal to 8 in the above provided example, only the samples T(4) to T(7) are input to perform the correlation process (see FIG. 15B). Similarly, "performing the correlation process in the symbol time N" means that all of the samples T(0) to T(7) are input to perform the correlation process. Additionally, "performing the correlation process in the first subsymbol time T1" means that only the samples T(0) to T(3) are input to perform the correlation process.

The correlator 165, to which the outputs of the correlators 161 and 162 are input, detects a correlation between the outputs of these correlators. The correlator 166, to which the outputs of the correlators 163 and 164 are input, detects a correlation between the outputs of these correlators. The correlators 165 and 166 output "1" if the two input values are the same, or output a value (smaller than 1) according to a difference between the two input values if the two input values are not the same. A value close to "1" is output if the difference between the two input values is small, or a value close to "0" is output if the difference is large.

The comparing unit 167, to which the outputs of the correlators 165 and 166 are input, makes a comparison between these outputs.

Contents of the reception signal (3) and the synthesis signal (4) when the dispersion process is not performed (when dispersion is not made) on the side of the transmitter are shown in FIGS. 15B and 15C.

In this case, if the correlation process in the symbol time N is performed by the correlator 163, inter-code interference does not occur. Or, if the correlation process (by the correlator 164) in the first subsymbol time T1 is performed, inter-code interference does not occur. As described above, inter-code interference is not exerted on both of the results of the correlation processes performed by the correlators 163 and 164, and the correlation value output from the correlator 166 becomes 1.

In the meantime, inter-code interference is exerted on both of the result of the correlation process performed in the second subsymbol time T2 (by the correlator 161) for the reception signal (3) and that of the correlation process in the symbol time N (by the correlator 162) for the synthesis signal (4). Therefore, the correlation value output from the correlator 165 does not become 1.

Contents of the reception signal (3) and the synthesis signal (4) when the dispersion process is performed (when dispersion is made) on the side of the transmitter are shown in FIGS. 15D and 15E.

In this case, since inter-code interference does not occur in the correlation processes performed by the correlators 162 and 161, the correlation value output from the correlator 165 becomes 1. In the meantime, since inter-code interference occurs in the correlation processes performed by the correlators 163 and 164, the correlation value output from the correlator 166 does not become 1.

The comparing unit 167 outputs to the selecting unit 146 a signal, which indicates that dispersion is not made, if the correlation value output from the correlator 166 is larger than that output from the correlator 165, or outputs to the selecting unit 146 a signal, which indicates that dispersion is made, if the former value is not larger than the latter value.

The reason that the output (correlation value) of the correlator 165/166 becomes 1 (or does not become 1) in the above described cases is verified below with the above described specific example. Here, since data is "1", the output from the correlator when interference is not exerted becomes "1".

First assume that the code [1 1 1 1 1 1 1 1] is input to all of the correlators 161 to 164 as described above. As a verification method, for each of the correlators 161 to 164, the signals (C0, C1, C2), which configure the input signal (the reception signal (3) or the synthesis signal (4)), and the code [1 1 1 1 1 1 1 1] are multiplied, and their sum total is obtained and divided by the number of input samples (only for the example of this code sequence, it may be considered to divide a result obtained by integrating the signals (C0, C1, C2) by the number of input samples). The number of input samples is 4 for the correlators 161 and 164, and 8 for the correlators 162 and 163.

Taking as an example the case where the dispersion process is not performed on the side of the transmitter as shown in FIGS. 15B and 15C, the sum total of results obtained by multiplying C0 and the code [1 1 1 1 1 1 1 1] becomes 8, and the sum totals of results obtained by respectively multiplying C1 and C2 become 0 in the correlator 163. Therefore, the total results in 8, and 1 is obtained by dividing the total by the number of input samples (=8). In the meantime, in the correlator 164, the first half portion (T(0) to T(3)) of the respective signals (C0, C1, C2) and the latter half portion [1, 1, 1, 1] of the code are multiplied. Both of the sum totals of C0 and C2 become 0, whereas the sum total of C1 becomes 4. Therefore, the total results in 4, and 1 is obtained by dividing the total 4 by the number of input samples (=4). Accordingly, both of the inputs to the correlator 166 become 1, so that the correlator 166 outputs the correlation value 1.

In the meantime, in the correlator 161, the sum totals of C0, C1, and C2 become 4, −4, and 0 respectively, and the total results in 0. Therefore, the result of the division becomes 0. In the correlator 162, the sum totals of C0, C1, and C2 become 4, 4, and 0 respectively, and the total results in 8. Therefore, the result of the division becomes 1. Accordingly, in this case, the inputs to the correlators 165 become 0 and 1, so that the correlation value does not become 1 (becomes a value smaller than 1).

Consequently, in this case, the correlation value output from the correlator 166 is larger than that output from the correlator 165 as described above. If similar verification is made also for FIGS. 15D and 15E, their results become the same as the above description, although this is not particularly described. Also for the DFT units 111 to 114 and the correlators 115 and 116 in the above described example of the OFDM (FIG. 12, etc.), their results become the same as the above description if similar verification is made.

In the above described example, the phenomenon that "inter-code interference does not occur" means that the sum total of the signals other than the signal (CO) corresponding to the input code [1 1 1 1 1 1 1 1], namely, the sum total of each of C1 and C2 becomes 0.

Up to this point, the examples of the configurations and operations when the first basic configuration is applied to OFDM or CDMA are shown and described. However, examples of configurations and operations when the second basic configuration is applied to OFDM or CDMA are not shown and described. Fundamentally, this can be implemented only by adding the dispersion indicate signal generating unit 52 and the dispersion indicate signal multiplexing unit 51 to the configurations shown in FIGS. 9, 10, and 13 in a similar manner as in FIG. 5, and only by adding the dispersion indicate signal detecting unit 71 to the configurations shown in FIGS. 11 and 14 in a similar manner as in FIG. 7. Even if the second basic configuration is applied to OFDM or CDMA, only using the configurations shown in FIGS. 6A and 8A enables this implementation.

Here, as a method for allowing a determination of whether or not a received signal is a signal the transmission power of which is dispersed to a plurality of subsymbols on the side of the receiver, various methods can be considered in addition to the methods already described for the first and the second basic configurations. One example of such methods is described below as a further preferred embodiment.

The further preferred embodiment (No. 1) is first described.

FIG. 16 shows an example of the configuration of a transmitter in the further preferred embodiment for the OFDM modulation method.

The transmitter 170 shown in this figure comprises a serial-to-parallel converting unit 301, a mapping circuit 302, a power dispersing unit 172, a transmission power peak detecting unit 173, a selecting unit 174, a parallel-to-serial converting unit 175, a various-type timing signal generating unit 176, and an IFFT unit 177. Fundamentally, operations of these constituent elements are almost similar to those of the serial-to-parallel converting unit 301, the mapping circuit 302, the transmission power dispersing unit 92, the transmission power peak detecting unit 93, the selecting unit 94, the parallel-to-serial converting unit 95, the various-type timing signal generating unit 96, and the IFFT unit 303 in the transmitter 90 shown in FIG. 10. However, a difference exists in a point that also two dispersion detection signals (the first and the second dispersion detection signals) are externally input to the IFFT unit 177.

Accordingly, the IFFT (Inverse Fast Fourier Transform) unit 177, to which not only the output of the mapping circuit 302 but also the first and the second dispersion detection signals are input, converts the frequency regions of these input signals into time domains. Here, assume that the first and the second dispersion detection signals in the following description indicate dispersion detection signals after being processed by the IFFT (Inverse Fast Fourier Transform) unit 177.

Figure 17:
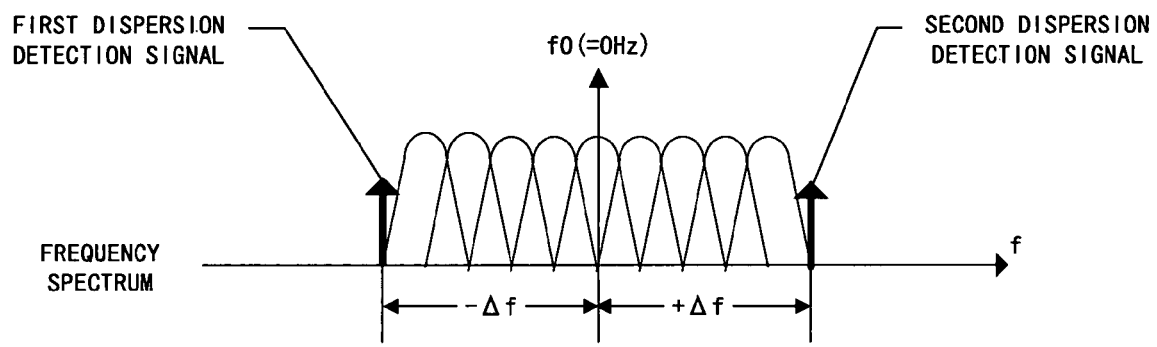
FIG. 17 is a schematic exemplifying a transmission spectrum in the further preferred embodiment in FIG. 16.

These two dispersion detection signals are inserted, for example, in a guard band of an OFDM modulation signal as shown in FIG. 17. These two dispersion detection signals become, for example, signals of frequencies "f0−Δf" and "f0+Δf" (Δf may be set to a suitable value) if the above described f0 (=0 Hz) is used as a reference, as shown in FIG. 17. Accordingly, these two dispersion detection signals have, for example, a relationship shown in FIG. 19B. Note that these two dispersion detection signals are made to become the above described even-numbered subcarriers. These two dispersion detection signals are not limited to the example of being inserted in the guard band of the OFDM modulation signal. For example, two unused subcarriers may be allocated to the two dispersion detection signals to generate an OFDM modulation signal.

FIG. 18 is a block diagram showing the configuration of a receiver which responds to the transmitter 170 shown in FIG. 16.

The receiver 180 shown in this figure comprises a serial-to-parallel converting unit 181, a symbol timing detecting unit 182, a various-type timing signal generating unit 183, a power combiner 184, a dispersion detection signal detecting unit 185, a selecting unit 186, an FFT unit 188, and a parallel-to-serial converting unit 187.

Among these constituent elements, the constituent elements other than the dispersion detection signal detecting unit 185 are the same as those shown in FIG. 11. Therefore, their descriptions are omitted. In the configuration shown in FIG. 18, the dispersion detection signal detecting unit 185 is provided as a replacement for the dispersion detecting unit 105 shown in FIG. 11.

The dispersion detection signal detecting unit 185, to which reception data is input as shown in FIG. 18, outputs to the selecting unit 186 a signal indicating that dispersion is made/not made. To the dispersion detection signal detecting unit 185, the output of the serial-to-parallel converting unit 181 may be input.

The dispersion detection signal detecting unit 185 comprised by the receiver 180 is described below with reference to FIG. 19.

As shown in FIG. 19A, the dispersion detection signal detecting unit 185 comprises DFT units 191, 192, 193, and 194, correlators 195 and 196, and a comparing unit 197. Functions of these constituent elements may be similar to those of the DFT units 111 to 114, the correlators 115 and 116, and the comparing unit 117, which are shown in FIG. 12A. However, for the DFT units 111 to 114 (191 to 194?), their input data and processing targets are different.

Namely, to the DFT units in the configuration shown in FIG. 12A, the reception signal or the synthesis signal is input. In the meantime, to all of the DFT units 191 to 194 shown in FIG. 19A, the reception signal is input. Additionally, the DFT units in the configuration shown in FIG. 12A perform the DFT process targeting the same even-numbered subcarrier. However, in the configuration shown in FIG. 19A, the DFT units 191 and 193 perform a DFT process targeting the first dispersion detection signal, whereas the DFT units 192 and 194 perform a DFT process targeting the second dispersion detection signal. Additionally, the DFT units 191 and 192 perform the DFT process in the second subsymbol time T2, whereas the DFT units 193 and 194 perform the DFT process in the OFDM symbol time N.

A summary of the above description is as follows.

The DFT unit 191 performs the DFT process in the second subsymbol time T2 for the first dispersion detection signal of the reception signal.

The DFT unit 192 performs the DFT process in the second subsymbol time T2 for the second dispersion detection signal of the reception signal.

The DFT unit 193 performs the DFT process in the symbol time N for the first dispersion detection signal of the reception signal.

The DFT unit 194 performs the DFT process in the symbol time N for the second dispersion detection signal of the reception signal.

The correlator 195 obtains a correlation between the output signals of the DFT units 191 and 192. The correlator 196 obtains a correlation between the output signals of the DFT units 193 and 194. The comparing unit 197, to which the outputs of the correlators 195 and 196 are input, makes a comparison between these outputs. The comparing unit 197 outputs to the selecting unit 186 a signal, which indicates that dispersion is made, if the output value of the correlator 195 is larger, or outputs to the selecting unit 186 a signal, which indicates that dispersion is not made, if the output value of the correlator 196 is larger.

If the reception signal is the signal indicating that dispersion is made, inter-subcarrier interference does not occur in the DFT process in the second subsymbol time T2. Therefore, the correlation between the outputs of the DFT units 191 and 192 becomes 1. In the meantime, inter-subcarrier interference occurs in the DFT process in the symbol time N. Therefore, the correlation between the outputs of the DFT units 193 and 194 does not become 1.

Similarly, if the reception signal is the signal indicating that dispersion is not made, the correlation between the outputs of the DFT units 191 and 192 does not become 1, but the correlation between the outputs of the DFT units 193 and 194 becomes 1.

Accordingly, these correlation values are compared, whereby whether or not dispersion is made can be detected.

FIGS. 19B and 19C show only the first and the second dispersion detection signals. Naturally, however, subcarriers are multiplexed to the reception signals. The frequencies of the subcarriers become frequencies other than those of the first and the second dispersion detection signals as a matter of course. In the examples of the signals shown in FIGS. 19B and 19C, the DFT units 191 to 194 output "1" if inter-subcarrier interference does not occur.

Figure 20:
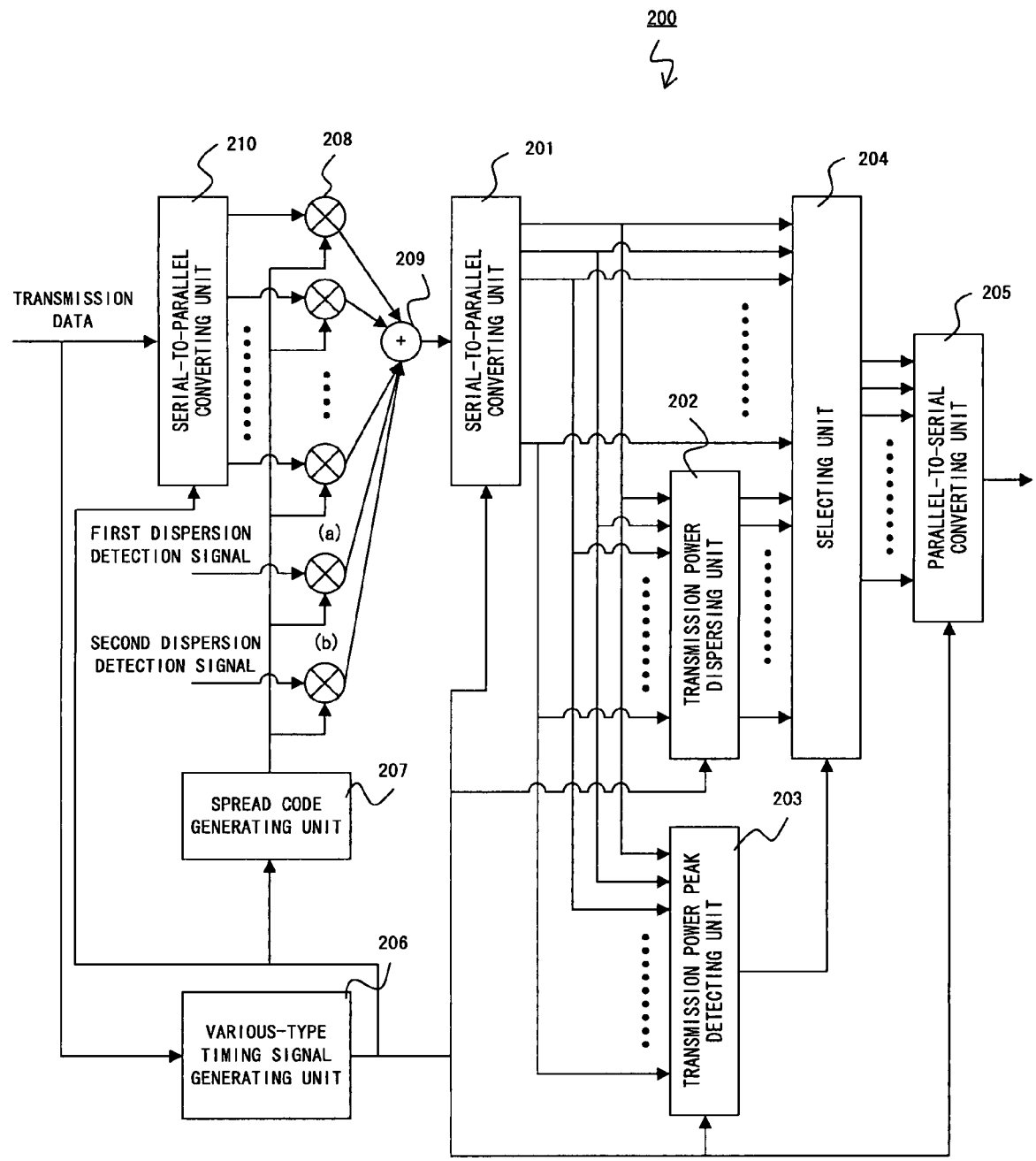
FIG. 20 is a block diagram exemplifying a configuration of a transmitter in a further preferred embodiment for the CDM modulation method.

FIG. 20 is a block diagram exemplifying a transmitter in a further preferred embodiment for the CDM modulation method.

The transmitter 200 shown in this figure comprises a serial-to-parallel converting unit 201, a transmission power dispersing unit 202, a transmission power peak detecting unit 203, a selecting unit 204, a parallel-to-serial converting unit 205, a various-type timing signal generating unit 206, a spread code generating unit 207, spreaders 208, a synthesizer 209, and a serial-to-parallel converting unit 210.

The above described configuration is almost the same as that of the transmitter 120 shown in FIG. 13. However, a difference exists in a point that not only the output signal of the serial-to-parallel converting unit 201 but also the two dispersion detection signals (the first and the second dispersion detection signals) are input to the spreaders 208, which perform a spread process also for these two dispersion detection signals by using an unused spread code among spread codes generated by the spread code generating unit 207.

The condition of this preferred embodiment is that the values of the first and the second dispersion detection signals are made identical. Since one-bit data is put on one symbol, both of the values of the first and the second dispersion detection signals are made to become "0" or "1" for each symbol.

Here, also assume that the spreaders 208 perform the spread process for the first dispersion detection signal by using the code [1 1 1 1 1 1 1 1], and for the second dispersion detection signal by using the code [1 1 −1 −1 1 1 −1 −1], and first and second detection signals (a) and (b) resultant from the spread process are made to become the codes [1 1 1 1 1 1 1 1] and [1 1 −1 −1 1 1 −1 −1] themselves as shown in FIG. 22B (the values of the first and the second dispersion detection signals are preset to implement this). The spread codes for the first and the second dispersion detection signals are not limited to the above provided examples. However, a code that is a repetition of the same code in the cycle of N/2 must be used.

FIG. 21 is a block diagram showing the configuration of a receiver 220 which responds to the above described transmitter 200.

The receiver 220 shown in this figure comprises a serial-to-parallel converting unit 221, a symbol timing detecting unit 222, a various-type timing signal generating unit 223, a power combiner 224, a dispersion detection signal detecting unit 225, a selecting unit 226, a parallel-to-serial converting unit 228, correlators 229, a spread code generating unit 230, and a parallel-to-serial converting unit 227.

A difference between the receiver 220 shown in FIG. 21 and the receiver 140 shown in FIG. 14 exists in a point that the dispersion detection signal detecting unit 225 is provided as a replacement for the dispersion detecting unit 145 in the receiver 140. In the example shown in this figure, reception data is input to the dispersion detection signal detecting unit 225 unchanged. However, the output of the serial-to-parallel converting unit 221 may be input.

FIG. 22A shows an example of the dispersion detection signal detecting unit 225.

The dispersion detection signal detecting unit 225 shown in this figure comprises correlators 241, 242, 243, 244, 245, and 246, and a comparing unit 247. Functions of these constituent elements are similar to those of the corresponding constituent elements shown in FIG. 15A. However, for the correlators 241 to 244, their input data and processing targets are different.

Namely, the reception signal or the synthesis signal is input to the correlators 161 to 164 in the configuration shown in FIG. 15A. However, the reception signal is input to all of the correlators 241 to 244 shown in FIG. 22A. Additionally, the correlators 161 to 164 shown in FIG. 15A perform the correlation process by using any one of the codes that are a repetition of the same code in the cycle of N/2 (however, the same codes are used in all of the correlators). In the meantime, the correlators 241 to 244 shown in FIG. 22A perform a correlation process by using the code corresponding to either of the first and the second detection signals. Namely, the correlators 241 and 243 perform the correlation process by using the code ([1 1 1 1 1 1 1 1] as described above) utilized to spread the first dispersion detection signal, and the correlators 242 and 244 perform the correlation process by using the code ([1 1 −1 −1 1 1 −1 −1] as described above) utilized to spread the second dispersion detection signal.

Furthermore, the correlators 241 and 242 perform the correlation process in the second subsymbol time T2, whereas the correlators 243 and 244 perform the correlation process in the symbol time N.

A summary of the above description is as follows.

The correlator 241 performs the correlation process in the second subsymbol time T2 for the first detection signal of the reception signal.

The correlator 242 performs the correlation process in the second subsymbol time T2 for the second detection signal of the reception signal.

The correlator 243 performs the correlation process in the symbol time N for the first detection signal of the reception signal.

The correlator 244 performs the correlation process in the symbol time N for the second detection signal of the reception signal.

The correlator 245, to which the outputs of the correlators 241 and 242 are input, obtains a correlation value, and outputs the obtained value to the comparing unit 247. The correlator 246, to which the outputs of the correlators 243 and 244 are input, obtains a correlation value, and outputs the obtained value to the comparing unit 247. The comparing unit 247 makes a comparison between the output values of the correlators 245 and 246. The comparing unit 247 outputs to the selecting unit 226 a signal, which indicates that dispersion is not made, if the output of the correlator 246 is larger, or outputs to the selecting unit 226 a signal, which indicates that dispersion is made, if the output of the correlator 245 is larger.

Only the first and the second dispersion detection signals included in the reception signal to which various types of signals are multiplexed are shown in FIGS. 22B and 22C. Naturally, however, other signals exist. Therefore, inter-code interference with the other signals is included in inter-code interference.

The first and the second detection signals when dispersion is not made are shown in FIG. 22B. As a matter of course, these signals become the first and the second detection signals (a) and (b) themselves, which are described with reference to FIG. 20. In the meantime, the first and the second detection signals when dispersion is made, which are shown in FIG. 22C, become the first and the second detection signals (a) and (b) where the first subsymbol is in a state of a no signal as shown in this figure.

Accordingly, since inter-code interference does not occur in the correlation processes performed by the correlators 241 and 242 when dispersion is made (and the values of the first and the second dispersion detection signals are the same as described above) in this example, the outputs of the correlators 241 and 242 become identical (such as "1"), and the output of the correlator 245 becomes "1" as a matter of course. In the meantime, inter-code interference occurs in the correlation processes performed by the correlators 243 and 244 when dispersion is made. Therefore, the output of the correlator 246 does not become "1" (becomes a value smaller than 1). Accordingly, the comparing unit 247 outputs a signal indicating that dispersion is made.

Similarly, when dispersion is not made, the output of the correlator 245 does not become "1" (becomes a value smaller than 1), and the output of the correlator 246 becomes "1". Therefore, the comparing unit 247 outputs a signal indicating that dispersion is not made.

Figure 23A:
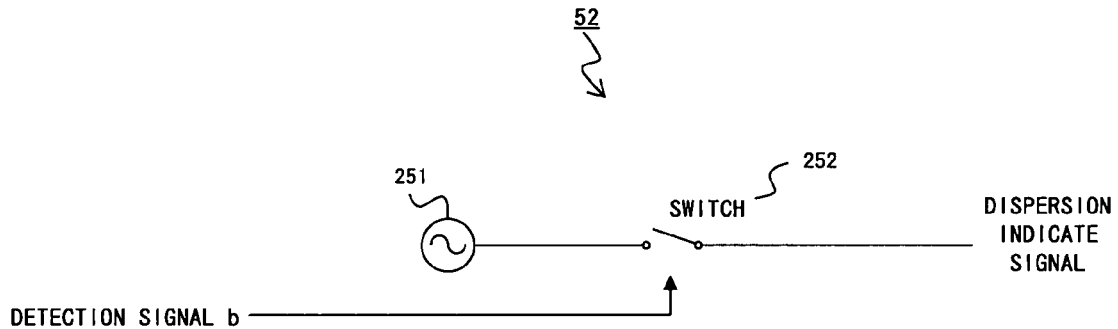
FIGS. 23A and 23B are schematics showing another example of a configuration for generating a dispersion indicate signal and various types of signals in the configuration.
Figure 23B:
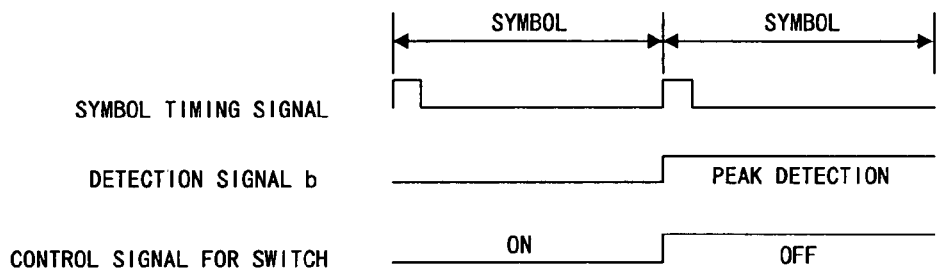

An example of another configuration of the dispersion indicate signal generating unit 52 is shown in FIG. 23A.

The example of the configuration of the dispersion indicate signal generating unit 52 is already shown in FIG. 6A. However, the configuration is not limited to this example, and may be, for instance, the configuration shown in FIG. 23A, or the like.

FIG. 23A shows the example where whether or not transmission power is dispersed is generated as an ASK signal.

An oscillator 251 outputs a signal of a predetermined frequency. In this example, the signal the cycle of which is one half of a symbol length is generated and output.

ON/OFF of a switch 252 is controlled with the detection signal b. Namely, the switch 252 is turned on when the detection signal b is "0", and turned off when the detection signal b is "1". The detection signal b is already described with reference to FIG. 6, etc.

Figures 23C, 23D:
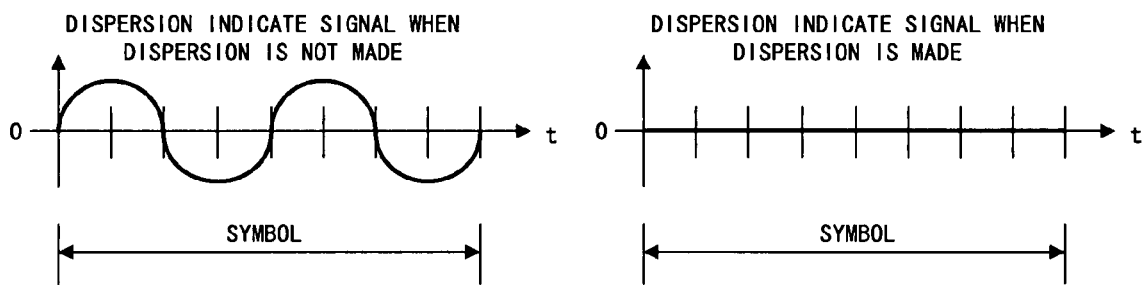
FIGS. 23C and 23D show examples of the dispersion indicate signal.

With the operations of the switch 252, a dispersion indicate signal when the detection signal b is "0" (when dispersion is not made) becomes the output signal of the oscillator 251 as shown in FIG. 23C. In the meantime, a dispersion indicate signal when the detection signal b is "1" (when dispersion is made) becomes a state of a no signal as shown in FIG. 23D.

Such a dispersion indicate signal is multiplexed as described with reference to FIG. 5. Therefore, the dispersion indicate signal, which indicates whether or not the transmission signal is a signal dispersed to a plurality of subsymbols, can be multiplexed and transmitted without causing interference.

FIG. 24A shows an example of the configuration of the dispersion indicate signal detecting unit 71 when the dispersion indicate signal generating unit 52 has the configuration shown in FIG. 23A. Namely, this is an example of another configuration other than that shown in FIG. 8A.

The dispersion indicate signal detecting unit 71 in the example shown in FIG. 24A comprises a dispersion indicate signal extracting unit 261, a detector 262, a discriminator 263, and a timing signal generating unit 264.

The timing signal generating unit 264 outputs an input symbol timing signal to the discriminator 263. The discriminator 263 makes a comparison between the signal output from the detector 262 and a preset threshold level for each symbol based on the symbol timing signal. The discriminator 263 outputs a signal, which indicates that dispersion is not made, if the signal output from the detector 262 exceeds the threshold level, or outputs a signal, which indicates that dispersion is made, if the signal does not exceed the threshold level.

Specifically, the dispersion indicate signal extracting unit 261 is a filter that makes only a particular frequency region pass through. Naturally, only the frequency of the output signal of the oscillator 251 is made to pass through. Accordingly, the dispersion indicate signal extracting unit 261 extracts the dispersion indicate signal shown in FIG. 23C, which is included in the reception signal, when dispersion is not made, but cannot extract any signals when dispersion is made (a no signal is output). Since the dispersion indicate signal when dispersion is made is the no signal as shown in FIG. 23D, it may be considered that the dispersion indicate signal (null signal) shown in FIG. 23D is extracted.

Accordingly, as shown in FIG. 24B, the signal after being detected by the detector 262 becomes a signal the level of which is equal to or higher than a predetermined level when dispersion is not made, and becomes almost 0 level when dispersion is made. Therefore, if a comparison with the threshold level is made by the discriminator 263, whether or not dispersion is made can be detected.

With the communications system, transmitter, receiver, etc. thereof according to the present invention, PAPR can be decreased without degrading a bit error rate. Therefore, power consumption can be reduced, and downsizing can be realized.

What is claimed is:

1. A communications system having a transmitter and a receiver, wherein:

the transmitter comprises a transmission power peak detecting unit configured to measure each transmission power within a symbol, and to detect whether or not a measured value exceeds a preset threshold value, for each symbol of a multiplexed transmission sample or transmission chip, a power dispersing unit configured to generate and output a dispersion signal by dispersing each transmission power within the symbol to a plurality of subsymbols configured by partitioning the symbol, a dispersion indicate signal generating unit configured to generate a dispersion indicate signal, which indicates that the transmission power within the symbol is dispersed to the plurality of subsymbols, if said transmission power peak detecting unit detects that the measured value exceeds the threshold value, and a dispersion indicate signal multiplexing unit configured to multiplex the dispersion indicate signal to the transmission signal, and the transmitter makes a transmission to the receiver by using the dispersion signal output from said power dispersing unit if said transmission power peak detecting unit detects that the measured value exceeds the preset threshold value; and the receiver comprises a dispersion detecting unit, upon receipt of a signal transmitted from the transmitter, configured to detect whether or not the reception signal is the dispersion signal for each symbol of the reception signal, and to output a detection signal, a power combiner configured to synthesize power dispersed to the plurality of subsymbols within the symbol, and to output a synthesis signal, and a selecting unit configured to select and output either of the reception signal and the synthesis signal according to the detection signal.

2. A transmitter, comprising:

a transmission power peak detecting unit configured to measure each transmission power within a symbol, and to detect whether or not a measured value exceeds a preset threshold value, for each symbol of a multiplexed transmission sample or transmission chip;

a power dispersing unit configured to generate and output a dispersion signal by dispersing each transmission power within the symbol to a plurality of subsymbols configured by partitioning the symbol;

a dispersion indicate signal generating unit configured to generate a dispersion indicate signal, which indicates that the transmission power within the symbol is dispersed to the plurality of subsymbols, if said transmission power peak detecting unit detects that the measured value exceeds the threshold value; and a dispersion indicate signal multiplexing unit configured to multiplex the dispersion indicate signal to the transmission signal, and the transmitter outputting a transmission signal to an arbitrary receiver by using the dispersion signal output from said power dispersing unit, if said transmission power peak detecting unit detects that the measured value exceeds the preset threshold value.

3. The transmitter according to claim 2, in a case of a communication of an OFDM modulation method, said transmitter further comprising:

a dispersion signal multiplexing unit configured to add two dispersion detection subcarriers to a guard band or a band of unused subcarriers by using two dispersion detection signals.

4. The transmitter according to claim 2, in a case of a communication of a CDM modulation method, said transmitter further comprising:

a spreading unit configured to perform a spread process by using an unused spread code for two dispersion detection signals.

5. A receiver, comprising:

a dispersion detecting unit, upon receipt of a signal transmitted from an arbitrary transmitter, configured to detect whether or not the reception signal is a dispersion signal generated by dispersing each transmission power within a symbol to a plurality of subsymbols configured by partitioning the symbol, for each symbol of the reception signal, and to output a detection signal;

a power combiner configured to synthesize power dispersed to the plurality of subsymbols within the symbol, and to output a synthesis signal; and a selecting unit configured to select and output either of the reception signal and the synthesis signal according to the detection signal, wherein the receiver further comprising as a replacement for said dispersion detecting unit, a dispersion indicate signal detecting unit configured to extract a dispersion indicate signal, which indicates whether or not power dispersion is made, from the reception signal, and to detect whether or not dispersion of the transmission power is made based on the dispersion indicate signal.

6. The receiver according to claim 5, in a case of a communication of an OFDM modulation method, said receiver further comprising: if the reception signal is a signal where the dispersion detection subcarriers are added to a guard band or a band of unused subcarriers, as a replacement for said dispersion detecting unit, a dispersion detection signal detecting unit configured to detect whether or not dispersion of the transmission power is made by using the dispersion detection subcarriers.

7. The receiver according to claim 5, in a case of a communication of a CDM modulation method, said receiver further comprising:

if the reception signal includes detection signals generated by spreading two dispersion detection signals with an unused spread code, as a replacement for said dispersion detecting unit, a dispersion detection signal detecting unit configured to detect whether or not dispersion of the transmission power is made by using the detection signals.

8. A communications method for use in a communications system having a transmitter and a receiver, comprising:

detecting whether or not transmission power within a symbol exceeds a preset threshold value for each symbol of a multiplexed transmission sample or transmission chip, generating a dispersion signal by dispersing the transmission power within the symbol to a plurality of subsymbols configured by partitioning the symbol for the symbol which exceeds the threshold value, and transmitting the dispersion signal to the receiver, on a side of the transmitter;

detecting whether or not a reception signal is the dispersion signal, and outputting a detection signal, and synthesizing power dispersed to the plurality of subsymbols, and outputting a synthesis signal, and selecting and outputting either of the reception signal and the synthesis signal according to the detection signal, on a side of the receiver;

generating a dispersion indicate signal, which indicates that the transmission power within the symbol is dispersed to the plurality of subsymbols, if the measured value exceeds the threshold value is detected; and multiplexing the dispersion indicate signal to the transmission signal.

9. A communications system having a transmitter and a receiver, wherein:

the transmitter comprises a transmission power peak detecting unit, to which a plurality of sample signals that are parallel signals for one symbol of a multiplexed transmission sample or transmission chip are input, configured to measure instantaneous transmission power of each of the plurality of sample signals, and to detect whether or not any one or more of measured values exceed a preset threshold value, a power dispersing unit, to which the plurality of sample signals are input, configured to generate and output a plurality of dispersion signals by dispersing transmission power of each of the plurality of sample signals to a plurality of subsymbols configured by partitioning the symbol, and a selecting unit, to which the plurality of sample signals and the plurality of dispersion signals are input, configured to select and output either of the sample signals and the dispersion signals according to a detection result of said transmission power peak detecting unit, and the transmitter makes a transmission to the receiver by using an output of said selecting unit; and the receiver comprises a serial-to-parallel converting unit configured to convert one symbol of a reception signal into parallel signals, and configured to output the parallel signals, upon receipt of the signal transmitted from the transmitter, a power combiner unit configured to synthesize reception power dispersed to the plurality of subsymbols, and to output a synthesis signal, a dispersion detecting unit, to which an output of said serial-to-parallel converting unit and the synthesis signal are input, configured to detect whether or not the one symbol of the reception signal is dispersed to the plurality of subsymbols, and to output a detection signal, and a selecting unit configured to select and output either of the output of the serial-to-parallel converting unit and the synthesis signal according to the detection signal, wherein in a case of a communication of an OFDM modulation method, said dispersion detecting unit comprises a plurality of DFT units, to which the output of said serial-to-parallel converting unit or an output of said synthesizing unit is input, configured to perform a DFT process for an arbitrary even-numbered subcarrier, and two correlators, to which outputs of a particular pair of DFT units among said plurality of DFT units are input, configured to obtain a correlation; and whether or not the one symbol of the reception signal is dispersed to the plurality of subsymbols is detected by making a comparison between outputs of said two correlators.

10. A receiver, comprising:

a serial-to-parallel converting unit configured to convert one symbol of a reception signal into parallel signals, and to output the parallel signals, upon receipt of the signal transmitted from an arbitrary transmitter;

a power combiner unit configured to synthesize reception power dispersed to the plurality of subsymbols, and to output a synthesis signal;

a dispersion detecting unit, to which an output of said serial-to-parallel converting unit and the synthesis signal are input, configured to detect whether or not the one symbol of the reception signal is dispersed to a plurality of subsymbols, and to output a detection signal; and a selecting unit configured to select and output either of the output of the serial-to-parallel converting unit and the synthesis signal according to the detection signal, wherein:

in a case of a communication of an OFDM modulation method, said dispersion detecting unit comprises a plurality of DFT units, to which the output of said serial-to-parallel converting unit or an output of said synthesizing unit is input, configured to perform a DFT process for an arbitrary even-numbered subcarrier, and two correlators, to which outputs of a particular pair of DFT units among said plurality of DFT units are input, configured to obtain a correlation; and whether or not the one symbol of the reception signal is dispersed to the plurality of subsymbols is detected by making a comparison between outputs of said two correlators.

11. The receiver according to claim 10, in a case of a communication of a CDM modulation method, said receiver further comprising:

as a replacement for said dispersion detecting unit, a plurality of correlating units, to which the output of said serial-to-parallel converting unit or the output of said synthesizing unit is input, configured to perform a correlation process by using a particular orthogonal code; and two correlators, to which outputs of a particular pair of correlating units among said plurality of correlating units are input, configured to obtain a correlation, wherein whether or not the one symbol of the reception signal is dispersed to the plurality of subsymbols is detected by making a comparison between outputs of said two correlators.

12. The receiver according to claim 10 in a case of a communication of an OFDM modulation method, if the reception signal is a signal where dispersion detection subcarriers are added to a guard band or a band of unused subcarriers, said receiver further comprising:

as a replacement for said dispersion detecting unit, a plurality of DFT units, to which the output of said serial-to-parallel converting unit is input, configured to perform, respectively, a DFT process targeting any one of the two dispersion detection subcarriers; and two correlators, to which outputs of a particular pair of DFT units among said plurality of DFT units are input, configured to obtain a correlation, wherein whether or not the one symbol of the reception signal is dispersed to the plurality of subsymbols is detected by making a comparison between outputs of said two correlators.

13. The receiver according to claim 10, in a case of a communication of a CDM modulation method, if the reception signal includes a signal generated by spreading two dispersion detection signals with an unused spread code, said receiver further comprising:

as a replacement for said dispersion detecting unit, a plurality of correlating units, to which the output of said serial-to-parallel converting unit is input, configured to perform, respectively, a correlation process by using the spread code; and two correlators, to which outputs of a particular pair of correlating units among said plurality of correlating units are input, configured to obtain a correlation, wherein whether or not the one symbol of the reception signal is dispersed to the plurality of subsymbols is detected by making a comparison between outputs of said two correlators.

14. The receiver according to claim 10, wherein:

said synthesizing unit comprises adders configured to output a sum of a plurality of reception sample signals for each pair of the plurality of reception sample signals within the symbol of the reception signal, and subtractors configured to obtain a difference between the plurality of reception sample signals; and each of said adders and each of said subtractors are made to correspond to each of the plurality of subsymbols.

15. A transmitter, comprising:

a transmission power peak detecting unit, to which a plurality of sample signals that are parallel signals for one symbol of a multiplexed transmission sample or transmission chip are input, configured to measure instantaneous transmission power of each of the plurality of sample signals, and-to detect whether or not any one or more of measured values exceed a preset threshold value;

a power dispersing unit, to which the plurality of sample signals are input, configured to generate and output a plurality of dispersion signals by dispersing transmission power of each of the plurality of sample signals to a plurality of subsymbols configured by partitioning the one symbol; and a selecting unit, to which the plurality of sample signals and the plurality of dispersion signals are input, configured to select and output either of the sample signals and the dispersion signals according to a detection result of said transmission power peak detecting unit, and the transmitter transmitting a transmission signal to an arbitrary receiver by using an output of said selecting unit, wherein:

said power dispersing unit comprises adders configured to output a sum of a plurality of sample signals for each pair of the plurality of sample signals, subtractor configured to output a difference between the plurality of sample signals, and attenuators configured to attenuate power of an output signal of each of said adders and each of said subtractors; and said attenuators are made to correspond to each of the plurality of subsymbols.

* * * * *